(12) United States Patent
Brandl

(10) Patent No.: US 12,511,570 B2
(45) Date of Patent: Dec. 30, 2025

(54) ION SHUTTLING SYSTEM CONTROL

(71) Applicant: Infineon Technologies Austria AG, Villach (AT)

(72) Inventor: Matthias Brandl, Kirchseeon (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 18/601,805

(22) Filed: Mar. 11, 2024

(65) Prior Publication Data
US 2025/0284992 A1 Sep. 11, 2025

(51) Int. Cl.
| | | |
|---|---|---|
| G06N 10/40 | (2022.01) | |
| G06N 10/20 | (2022.01) | |
| G21K 1/00 | (2006.01) | |
| H03M 1/66 | (2006.01) | |

(52) U.S. Cl.
CPC ............ *G06N 10/40* (2022.01); *G06N 10/20* (2022.01); *G21K 1/00* (2013.01); *H03M 1/662* (2013.01)

(58) Field of Classification Search
CPC .......... G06N 10/40; G06N 10/20; G21K 1/00; H03M 1/662
USPC ......................................... 327/1, 4; 326/1, 4
See application file for complete search history.

(56) References Cited

U.S. PATENT DOCUMENTS

| | | | |
|---|---|---|---|
| 12,278,019 B2 * | 4/2025 | Repp | ............... H03M 1/662 |
| 2023/0297872 A1 | 9/2023 | Semo et al. | |
| 2023/0325698 A1 | 10/2023 | Furtner | |
| 2024/0006092 A1 | 1/2024 | Repp | |
| 2024/0030019 A1 | 1/2024 | Brandl | |

FOREIGN PATENT DOCUMENTS

| | | |
|---|---|---|
| CN | 117332867 A | 1/2020 |
| CN | 117389178 A | 1/2024 |
| WO | 2022146577 A2 | 7/2022 |

OTHER PUBLICATIONS

How to wire a 1000-qubit trapped ion quantum computer M. Malinowski, 1, * D. T. C. Allcock, 1, 2 and C. J. Ballance1, 3 arXiv:2305.12773v1 [quant-ph] May 22, 2023 (Year: 2023).*
Delaney, et al., "Scalable Multispecies Ion Transport in a Grid Based Surface-Electrode Trap," https://arxiv.org/abs/2403.00756, Mar. 4, 2024, 11 pages.
Kreppel, et al., "Quantum Circuit Compiler for a Shuttling-Based Trapped-Ion Quantum Computer," https://arxiv.org/abs/2207.01964, Nov. 2, 2023, 35 pages.

(Continued)

*Primary Examiner* — Arnold M Kinkead
(74) *Attorney, Agent, or Firm* — Slater Matsil, LLP

(57) ABSTRACT

An ion shuttling control system is disclosed. The ion shuttling control system includes a controller configured to generate a first operation code, the first operation code indicating a first ion manipulation operation of a plurality of ion manipulation operations and a first set of electrodes of a plurality of sets of electrodes of an ion trap; a plurality of digital-to-analog converters (DACs) configured to generate a first set of analog waveforms, the first set of analog waveforms being selected based on the first operation code; and a switching network configured to provide the first set of analog waveforms to the first set of electrodes, the first set of electrodes being selected based on the first operation code.

21 Claims, 21 Drawing Sheets

(56) References Cited

OTHER PUBLICATIONS

Malinowski, et al., "How to wire a 1000-qubit trapped ion quantum computer," https://arxiv.org/abs/2305.12773, May 22, 2023, 21 pages.
Chauhan, Nitesh et al., "Trapped ion qubit and clock operations with a visible wavelength photonic coil resonator stabilized integrated Brillouin laser", Feb. 1, 2024, XP093280721, 13 pages.
Durandau, Jonathan et al., "Automated Generation of Shuttling Sequences for a Linear Segmented Ion Trap Quantum Computer", Oct. 31, 2023, XP093280740, 17 pages.
Schoenberger, Daniel et la., "Shuttling for Scalable Trapped-lon Quantum Computers", Feb. 21, 2024, XP093280741, 7 pages.

* cited by examiner

ION SHUTTLING SYSTEM CONTROL

TECHNICAL FIELD

The present invention relates generally to moving ions in an ion trap, and, in particular embodiments, to controlling the movement of the ions to perform movement operations.

BACKGROUND

Generally, ion traps may be used for trapped ion quantum computing, with ions used as qubits for computation. For example, the excitation state of an electron may indicate a logical value or logic state. Ions such as barium (Ba), magnesium (Mg), calcium (Ca), beryllium (Be), or the like, may, for example, be positively charged, and a single electron in the outer shall of the ion used as the logic element. Two or more ions may be entangled, as changing the state of one qubit causes the entangled qubits to change their state immediately, providing substantial speed and power savings over conventional computing. Additionally, ion traps may be used in atomic clocks, where the internal state of the ion is used as a frequency reference, for example for the definition of a second.

However, ion traps require a well-controlled environment, and precise movement of the ions. Generally, ions in an ion trap are trapped or controlled using a radio frequency (RF) field operating, e.g., at around 200 volts, and 20 megahertz (MHz). Additionally, ions, like any quantum system, have limited coherence times, requiring rapid handling. However, precise movement of the ions requires accurate control of electrical fields, and, therefore, the voltages which induce the electrical fields. Such accurate control of the voltages can be problematic for digital control systems.

SUMMARY

One embodiment is an ion shuttling control system, including a controller configured to generate a first operation code, the first operation code indicating a first ion manipulation operation of a plurality of ion manipulation operations and a first set of electrodes of a plurality of sets of electrodes of an ion trap; a plurality of digital-to-analog converters (DACs) configured to generate a first set of analog waveforms, the first set of analog waveforms being selected based on the first operation code; and a switching network configured to provide the first set of analog waveforms to the first set of electrodes, the first set of electrodes being selected based on the first operation code.

Another embodiment is another embodiment is an ion shuttling control system, including a plurality of digital-to-analog converters (DACs) configured to be coupled to a plurality of sets of electrodes of an ion trap, each set of electrodes having a same number of electrodes; a controller configured to generate first and second operation codes, the first operation code indicating data for first ion manipulation operations and a first set of electrodes of the plurality of sets of electrodes, and the second operation code indicating data for second ion manipulation operations and a second set of electrodes of the plurality of sets of electrodes; and a switching network configured to in response to the first operation code provide a first set of analog waveforms generated by the plurality of DACs based on the data for the first ion manipulation operations to the first set of electrodes; and in response to the second operation code provide a second set of analog waveforms generated by the plurality of DACs based on the data for the second ion manipulation operations to the second set of electrodes.

Another embodiment is an ion shuttling control system, including a plurality of digital-to-analog converters (DACs) configured to be coupled to a plurality of sets of electrode outputs configured to be connected to a plurality of sets of electrodes of an ion trap, each set of electrode outputs having a same number of electrode outputs; a plurality of operation registers coupled to the DACs and configured to store data corresponding with a plurality of ion manipulation operations; a controller configured to generate first and second operation codes, the first and second operation codes respectively identifying first and second operation registers respectively storing data for first and second ion manipulation operations, the first and second operation codes respectively identifying first and second sets of electrode outputs; and a switching network configured to in response to the first operation code select a first operation register based on the first operation code, and provide a first set of analog waveforms generated by the DACs based on the data stored in the first operation register to a first set of electrode outputs, the first set of electrode outputs being identified by the first operation code; and in response to the second operation code select a second operation register based on the second operation code, and provide a second set of analog waveforms generated by the DACs based on the data stored in the second operation register to a second set of electrode outputs, the second set of electrode outputs being identified by the second operation code.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
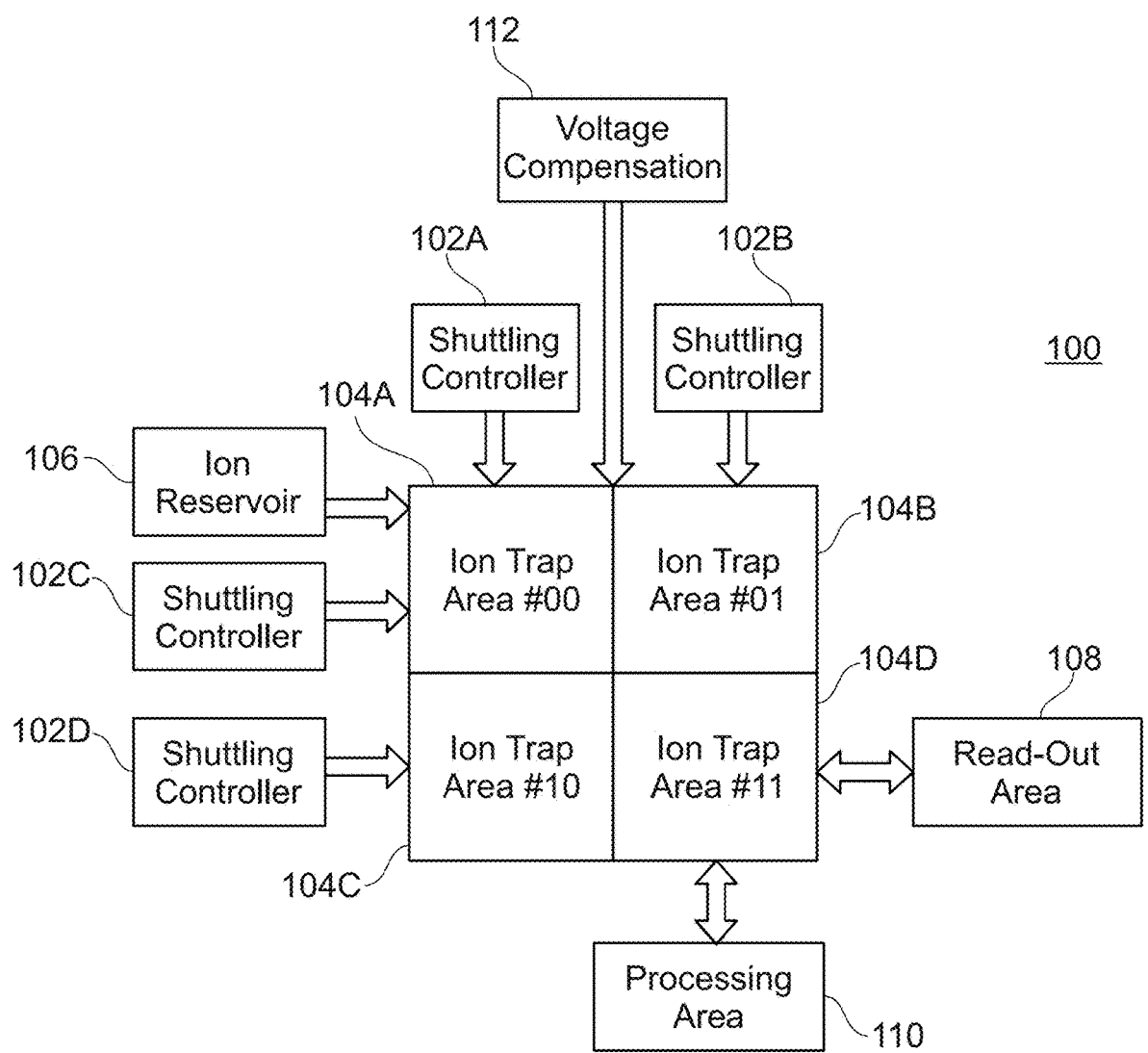
FIG. 1 is a logical diagram illustrating ion trap system with an ion shuttling system according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Ion trapping is a promising candidate for quantum computing processor architecture, atomic clocks, and other technologies dependent on isolating single ions. In Penning traps, the ions are confined via a magnetic field and an electrostatic potential. In Paul traps, the ions are confined via an RF-voltage and an electrostatic potential. In a trapped ion quantum computing system, electrostatic potentials are used to manipulate ions to perform ion control operations, for example, to move ions between storage and processing locations in a process called ion shuttling. Similarly, electrostatic potentials are used in atomic clocks to trap and control an ion, with properties of the ion used to define the length of a second.

In order to control the potentials, hundreds, or even thousands, of electrodes must be simultaneously controlled in order to provide the desired electrical field profiles (depending on the number of ions that are shuttled at the same time). In addition, the potentials applied to each electrode change over time (sometimes also referred to as voltage pulse or sequence of voltages) to induce the electric fields which cause the proper manipulation of the ions according to one of a finite set of manipulation operations, such as, but not limited to a no motion operation, an accelerate left operation, a move left right operation, break left operation, a break right operation, a split operation, emerge operation, a rotate clockwise operation, a rotate counterclockwise operation, a move from top side to left side operation, a move from top side to bottom side operation, a move from top side to right side operation, and move from left side to top side operation, a move from left side to bottom side operation, and move from left side to right side operation, and move from bottom side to top side operation, and move from bottom side to left side operation, a move from bottom side to right side operation, and move from right side to top side operation, a move from right side to left side operation, and a move from right side to bottom side operation. Each manipulation operation may use a sequence of voltages to be applied to each of a number of electrodes used to control a set of one or more ions.

In an embodiment, a plurality of registers each store digital values corresponding to a sequence of voltages to be applied via a DAC that is dedicated to a single ion trap electrode (e.g., when using digital multiplexing). In one example embodiment, the outputs of each register are successively applied to the input of a single DAC via a multiplexer to apply a voltage sequence to the ion trap electrode to which the single DAC is dedicated (e.g., when using analog multiplexing). In another example embodiment, each register is coupled to a corresponding DAC input, so that the voltage sequence is applied to the corresponding single ion trap electrode by successively changing the inputs of the DAC by changing the outputs of the register. This structure and operation may be repeated for multiple electrodes or groups of electrodes. By using a plurality of registers and at least one DAC dedicated to a single electrode, the voltage sequences can be locally applied to electrodes in a power efficient manner that advantageously reduces heating in a cryogenic environment of the ion trap and reduce the processing load of a controller.

In some embodiments, each set of a number of sets of operation registers stores digital data encoding the voltage sequence for a particular operation to be applied to a set of electrodes. For example, the set of electrodes may be used to perform a manipulation operation, such as any of a first manipulation operation which causes the ion set to move straight through a junction, a second manipulation operation which causes the ion set to turn right at a junction, and a third manipulation operation which causes the ion set turn left at a junction.

To cause the set of electrodes to perform a selected manipulation operation, a controller provides a set of control signals to control the state of a number of switches, where the control signals correspond with the selected manipulation operation. Accordingly, to perform a selected manipulation operation, the controller, after selecting the manipulation operation, generates a set of control signals corresponding with the selected manipulation operation. The generated set of control signals causes the switches to logically connect the set of electrodes to the set of operation registers storing data encoding the voltage sequence corresponding to the selected manipulation operation. For example, the set of electrodes may be logically connected to the set of operation registers, for example, by forming a signal path from the operation registers through multiplexors (MUXs) and digital to analog converters (DACs) configured to generate analog voltages for the electrodes based on data from the operation registers to the electrodes.

Because the voltage sequence corresponding to the selected manipulation operation are analog voltages, the switches logically connect the set of electrodes to the set of operation registers through a group of digital to analog converters (DACs). For example, each electrode of the set of electrodes may be connected to an operation register of the set of operation registers through one of the DACs and through a switch.

In some embodiments, the controller causes the digital data corresponding with each operation for the set of electrodes to be stored in the set of operation registers corresponding with each operation. In some embodiments, the values for the digital data are determined with a calibration operation.

Accordingly, to cause a particular operation, the controller sends control signals having an operation code identifying the operation and the electrodes to use for implementing the operation. For example, in some embodiments, the controller sends an operation code for each group of electrodes for each timeslot, as discussed in further detail below. In response to the operation code, a switching network establishes a logical path including a DAC from the identified electrodes to the operation registers storing data for the operation. Accordingly, when the quantum processor computes, a controller of the processor determines and communicates operations instead of determining and communicating DAC codes corresponding with a particular voltage waveform for each individual electrode implementing operations. For example, in some embodiments, a set of electrodes for a particular type of movement may be identified by the operation code so that voltage waveforms that correspond to the particular type of movement associated with the operation code are generated and connected to the target set of electrodes. In some embodiments, each of the electrodes in the target set of electrodes may receive a respective voltage pulse that may cause an ion that is located in proximity to the set of electrodes to perform a movement associated with the particular movement type identified by the operation code from the controller (such as "move left" or "move right").

FIG. 1 is a logical diagram illustrating an ion trap system 100 with an ion shuttling system according to some embodiments. The system 100 has one or more ion trap areas 104A-104D that include ion shuttling systems configured to shuttle ions between target areas such as an ion reservoir 106, ion read-out area 108, and other areas such as ion disposal areas (not shown), processing areas 110, and between the ion trap areas 104A-104D. The system 100 may also have one or more shuttling controllers 102A-102D electrically connected to the ion shuttling systems of the ion trap areas 104A-104D to control manipulation operations of the ions.

While the system 100 is illustrated with four ion trap areas 104A-104D and four shuttling controllers 102A-102D, with the ion trap areas 104A-104D in a symmetrical arrangement, the system 100 is not limited to such an arrangement. The shuttling controllers 102A-102D provide addressable voltage control of electrodes, and are, therefore, configured to control any number of, for example, cascaded ion trap areas 104A-104D, in any arrangement.

Additionally, the shuttling controller 102A-102D may be provided as a unitary controller, with a single controller controlling any number or size of the ion trap areas 104A-104D. The ion trap areas 104A-104D may also be cascaded so that additional ion trap areas 104A-104D and shuttling controllers 102A-102D may be connected to existing ion trap areas 104A-104D and shuttling controller 102A-102D to expand the shuttling area, number of ions controlled, and capabilities of the system 100.

The system 100 may have a radio frequency (RF) system (not shown) that provides an RF containment field separately from the DC bias of the shuttling electrodes. The RF field may be provided by electrodes that are separate from electrodes used to provide shuttling voltage fields. In some embodiments, the RF field may be operated at around 200 volts, and 20 megahertz (MHz), and the DC fields may be provided locally and separately to shuttle ions being contained by the RF field.

Figure 2:
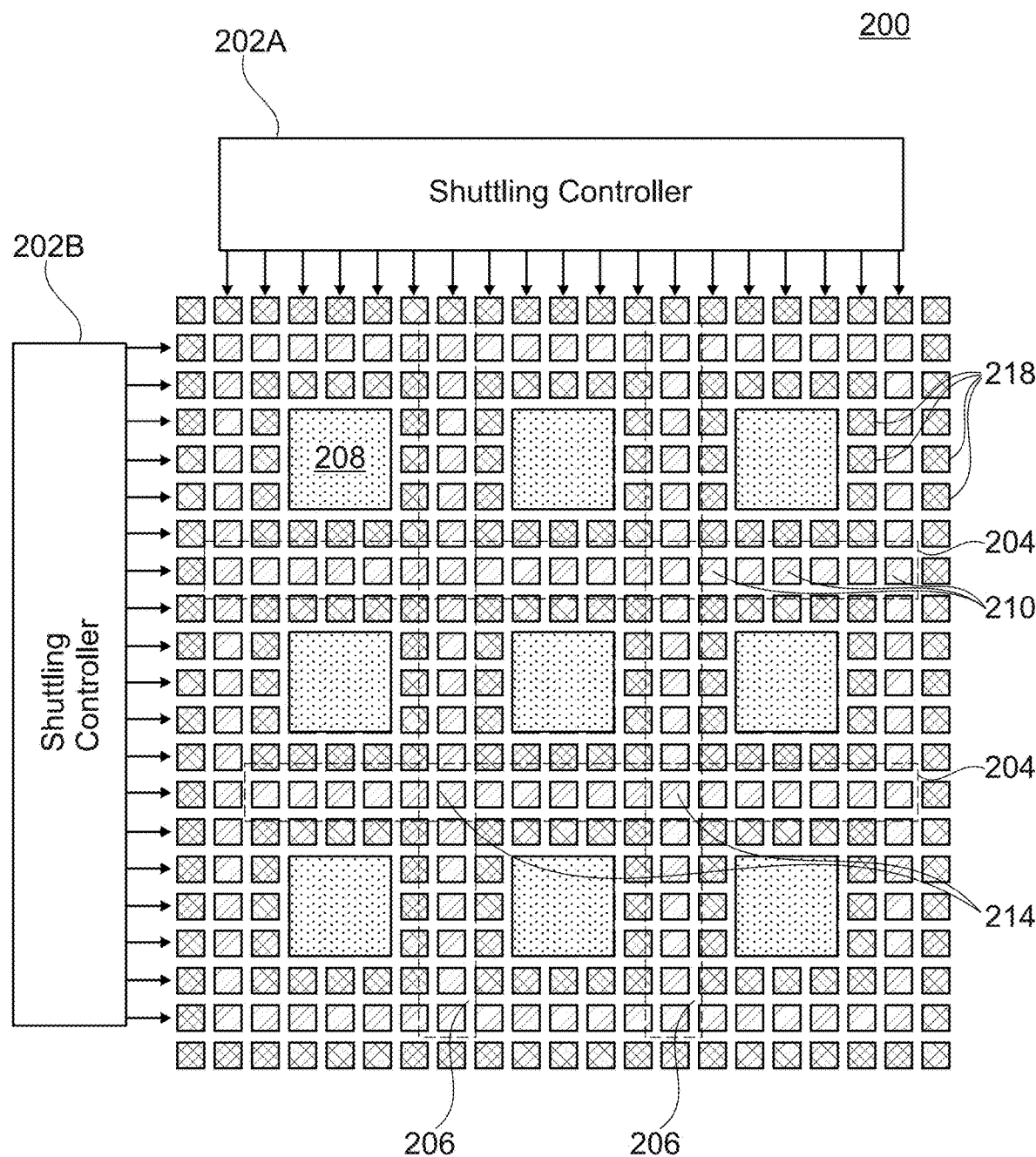
FIG. 2 is a diagram illustrating an ion shuttling system according to some embodiments.

FIG. 2 is a diagram illustrating an ion shuttling system 200 according to some embodiments. The ion shuttling system 200 includes a system controller 202 comprising a first shuttling controller portion 202A and second shuttling controller portion 202B. The first shuttling controller portion 202A and second shuttling controller portion 202B may be connected to a set of confinement or shuttling electrodes 210 arranged in a two-dimensional pattern, or in another arrangement with one dimension, or in three dimensions for layered patterns.

The ion shuttling system 200 may also have additional electrodes such as RF electrodes (not shown) disposed adjacent to, or among the shuttling electrodes 210. In some embodiments, the system 200 may have a lane element (not shown) along which ions may be shuttled.

The system controller 202 may provide a direct current (DC) biasing voltage to the shuttling electrodes 210 to perform manipulation operations, such as, for example, moving and steering ions along shuttling lanes 204, 206. The system controller 202 provides a DAC voltage to each shuttling electrode 210, which is determined by an operation register associated with a desired operation and the shuttling electrode 210.

The system controller 202 addresses individual electrode elements to provide a voltage signal to set the voltage for each shuttling electrode 210. Thus, the voltage of each shuttling electrode 210 may be set individually, and maintained until reset or changed.

In some embodiments, the system controller 202 addresses the individual shuttling electrodes 210 using an electrode control or addressing system, which controls application of a voltage to the shuttling electrodes 210. Thus, the shuttling electrode 210 in a particular column and row may have a shuttling voltage that is set by routing a voltage controlled by a DAC to a latch or storage element, such as a capacitor for the respective shuttling electrode 210, so that the electrode latch or storage element sets the voltage at the shuttling electrode 210.

In other embodiments, an RF field generated by voltages applied to the RF electrodes may hold an ion in position relative to the electrodes, or over a lane element, where present. The DC shuttling field provided by the shuttling electrodes 210 causes the ion to move along the electrodes or lane elements.

In some embodiments, manipulation or shuttling of the ion is performed by setting a DC voltage on an electrode to create DC bias in the electric field, with the DC bias allowing control of the position of ions along, or parallel to the lane 204. Changing the voltage on the shuttling electrodes 210 permits control of the movement of the ions along shuttling lanes 204, 206. The shuttling lanes 206, 204 may be arranged in a cross pattern to form junctions 214. This layout enables the ions to switch between different shuttling lanes 204, 206 for two dimensional movement. The shuttling electrodes 210 may be arranged so that free space is created between the shuttling electrodes 210, and shield elements 208 may be provided to shield the shuttling electrodes 210 and ions located in shuttling lanes 204, 206, from voltages provided for other ions in other locations along the shuttling lanes 204, 206.

Such an arrangement may reduce cross-talk between ions in the shuttling system 200 and simplify production of the shuttling system 200. Additionally, while the shuttling lanes 204, 206 and shuttling electrodes 210 are arranged in FIG. 2 in a symmetrical pattern, the shuttling electrodes 210 and shuttling lanes 204, 206 are not limited to such an arrangement, as any arrangement in two dimensions may be provided, including an arrangement where shuttling lanes 204, 206 intersect or cross at non-right angles. Additionally, shuttling lanes 204, 206 are not limited to crossing each other, as the shuttling lanes 204, 206 may form a three way, or 'T' intersection, or may form a turn or angle, such as an 'L' shaped intersection.

Figure 3:
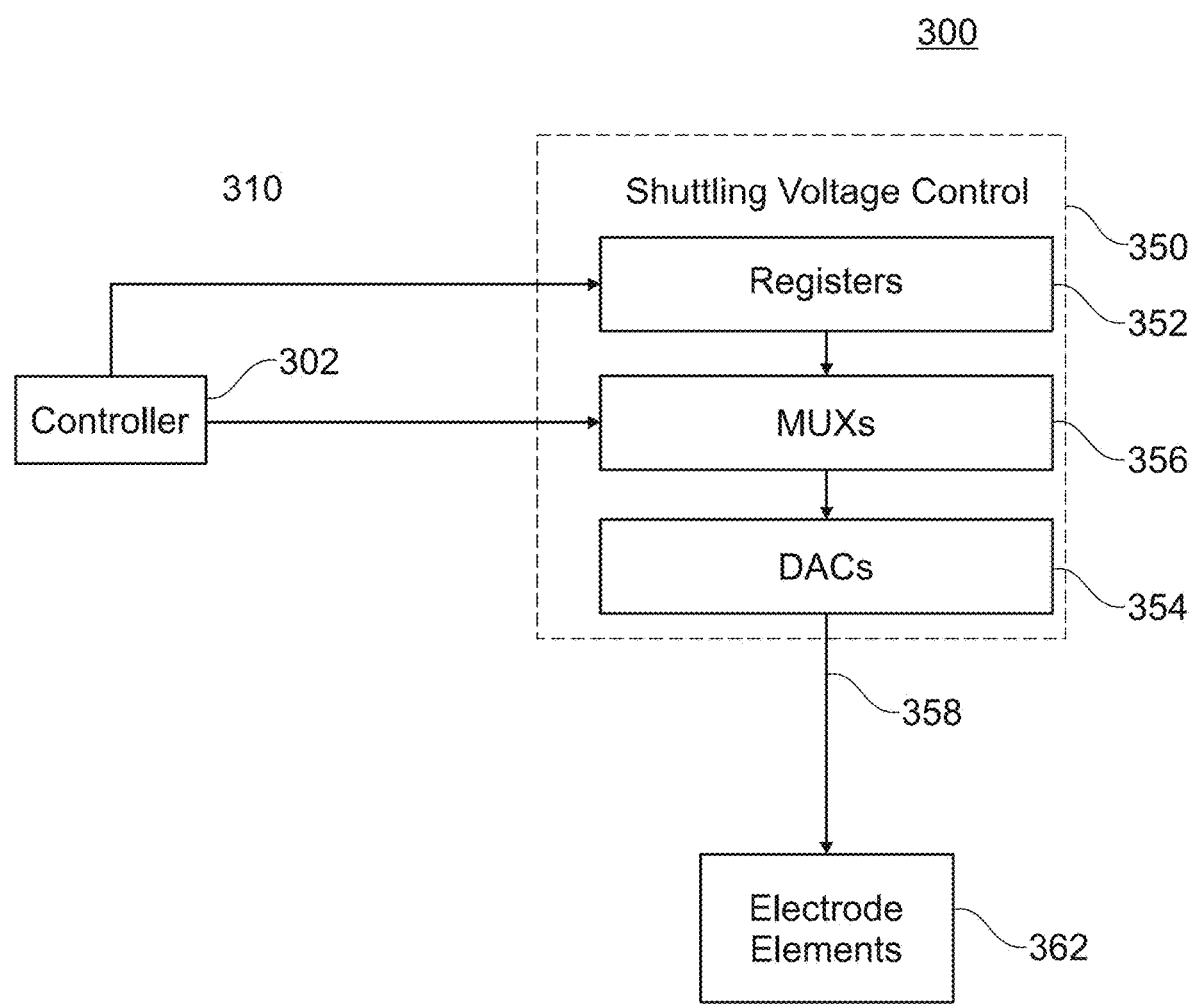
FIG. 3 is a diagram illustrating an ion shuttling control system according to some embodiments.

FIG. 3 is a diagram illustrating an ion shuttling control system 300 according to some embodiments. The ion shuttling control system 300 may have a system controller 302, an electrode voltage control system 350, and electrode elements 362. In general, the system controller may provide data signals to operation registers 352 of electrode voltage control system 350, and may provide control signals having operation code data to MUXs 356 of electrode voltage control system 350.

The electrode voltage control system 350 stores data in operation registers 352, where the data correspond to ion manipulation operations for particular electrodes. The electrode voltage control system 350 selectively connects DACs 354 to the operation registers 352 according to the operation code data from system controller 302. The electrode voltage control system 350 also generates analog voltages from the data values of the operation registers 352 with DACs 354. These analog voltages are applied to electrode elements 362 for inducing the electric fields that cause the identified electrodes to perform ion manipulation operations identified by the operation code data.

In some embodiments, the analog voltage values may include information, data, or values for a neutral voltage profile for holding ions a particular location, or may include information, data or values for shuttling voltages for a voltage profile such as a shuttling voltage profile for moving ions among locations corresponding with shuttling electrodes. Additionally, in some embodiments, the analog voltages may be keeping voltages for maintaining a base, default, or standard bias voltage against which the neutral voltage profiles or shuttling voltage profiles are changed to provide a localized electric field gradient to trap or control the ions.

In some embodiments, each set of control signals having operation code data provided to the MUXs 356 by system controller 302 cause the switches of the MUXs 356 to electrically connect the DACs 354 of electrodes identified by or corresponding to the set of control signals to operation registers 352 storing data for the operation identified by or corresponding to the operation code data. In some embodiments, the MUXs 356 includes a decoder circuit (not shown) configured to receive the operation code data and to generate a set of switch signals, which cause the switches of the MUXs 356 to electrically connect the correct DACs 354 to the correct operation registers. In some embodiments, the operation code data has a format which properly controls switches, and decoding is not necessary.

In some embodiments, multiple electrode voltage control systems 350 are used, and a single system controller performs the functions of the system controller 302 for each of the individual electrode voltage control systems 350. In some embodiments, each of the multiple electrode voltage control systems 350 has a separate system controller 302. In addition, a different controller coordinates the functionality of the individual electrode voltage control systems 350 by providing control signals to the system controllers 302 of the individual electrode voltage control systems 350.

Accordingly, in some embodiments, the operation registers 352 store data representing analog voltage waveforms which, when applied to the electrodes, cause ions to be moved according to ion manipulation operations preprogrammed in the operation registers 352. In some embodiments, because the operation registers are preprogrammed with data encoding the ion manipulation operation waveforms, the system controller 302 does not generate data encoding the ion manipulation operation waveforms to perform ion manipulation operations and does not transmit such data to the individual electrode voltage control systems 350. Instead, the system controller 302 provides operation code data to the individual electrode voltage control systems 350, where the operation code data enables or causes those operation registers 352 storing data corresponding to the ion manipulation operation of the operation code data to induce analog voltage waveforms at the electrodes so that the ion manipulation operation is performed.

Figure 4:
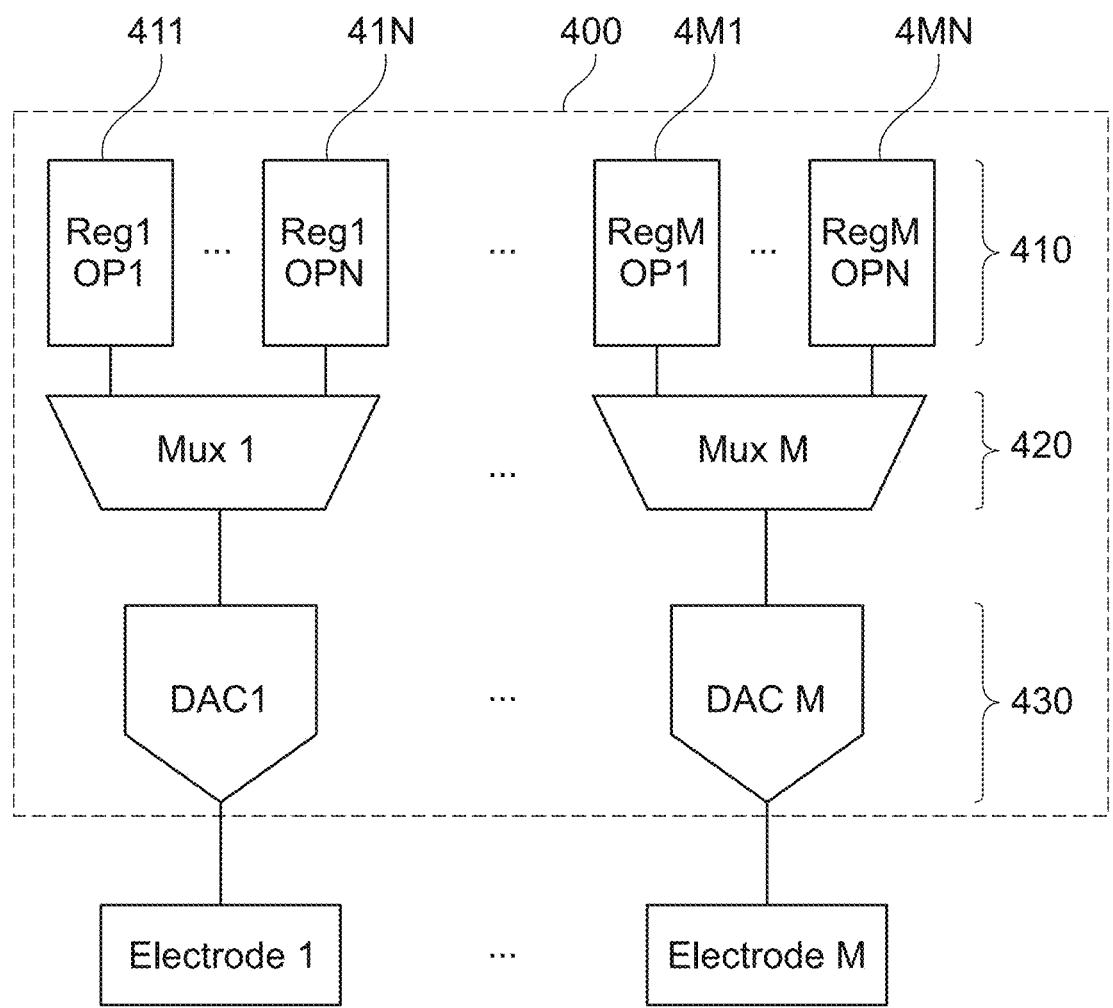
FIG. 4 is a diagram illustrating an electrode voltage control system according to some embodiments.

FIG. 4 is a diagram illustrating an electrode voltage control system 400 according to some embodiments. In some embodiments, an ion trap of ion shuttling control system 300 includes a number of groups of M electrodes 440, and electrode voltage control system 400 may be used in electrode voltage control system 350 to generate voltages for one group of M electrodes 440. In some embodiments, a number of electrode voltage control systems 400 may be used in electrode voltage control system 350 to generate voltages for a corresponding number of groups of M electrodes 440. In some embodiments, an ion trap of ion shuttling control system 300 includes M electrodes 440, and electrode voltage control system 400 may be used as electrode voltage control system 350 in ion shuttling control system 300.

Electrode voltage control system 400 includes operation registers 410 having properties and characteristics similar or identical to those described above with reference to operation registers 352, MUXs 420 having properties and characteristics similar or identical to those described above with reference to MUXs 356, and DACs 430 having properties and characteristics similar or identical to those described above with reference to DACs 364.

Operation registers 410 include multiple sets of operation registers, where each set of operation registers stores data values corresponding with a particular operation selectively performed by or with a group of M electrodes 440, identified as electrode 1 through electrode M. In the illustrated embodiment, operation registers 410 include N sets of operation registers, where each set of operation registers stores data values corresponding with one of N operations.

For example, a first operation register set stores a sequence of data values corresponding with a first operation of the N operations. The first operation register set includes M operation registers, identified as operation registers 411 through 4M1. Each of the operation registers 411 through 4M1 stores data corresponding to a sequence of analog voltage values for one of the M electrodes 440. For example, operation register 411 stores data corresponding to a sequence of analog voltage values for electrode 1 for the first operation, and operation register 41N stores data corresponding to a sequence of analog voltage values for electrode M for the first operation.

In addition, an Nth operation register set stores a sequence of data values corresponding with an Nth operation of the N operations. The Nth operation register set includes M operation registers, identified as operation registers 41N through 4MN. Each of the operation registers 41N through 4MN stores data corresponding to a sequence of analog voltage values for one of the M electrodes 440. For example, operation register 41N stores data corresponding to a sequence of analog voltage values for electrode 1 for the Nth operation, and operation register 4MN stores data corresponding to a sequence of analog voltage values for electrode M for the Nth operation.

In the illustrated embodiment, operation registers 411 through 41N store operation data sequences to be applied to electrode 1 and to no other electrodes. Accordingly, operation registers 411 through 41N are dedicated to electrode 1. Similarly, in the illustrated embodiment, operation registers 4M1 through 4MN store operation data sequences to be applied to electrode M and to no other electrodes. Accordingly, operation registers 4M1 through 4MN are dedicated to electrode M.

MUXs 420 include M MUXs, identified as MUX 1 through MUX M. As illustrated, the N inputs of MUX 1 are each connected to one of N operation registers, where each of the N operation registers store data for electrode 1 corresponding to a different one of the N operations. Furthermore, the output of MUX 1 is connected to DAC 1, which has an electrode output 450-1 for electrode 1. In addition, the N inputs of MUX M are each connected to one of N operation registers, where each of the N operation registers store data for electrode M corresponding to a different one of the N operations. Furthermore, the output of MUX M is connected to DAC M, which has an electrode output 450-M for electrode M.

In the illustrated embodiment, MUX 1 is connected to DAC 1 and MUX 1 and DAC 1 are configured to logically connect electrode 1 to one of operation registers 411 through 41N. Accordingly, MUX 1 and DAC 1 are dedicated to electrode 1. Similarly, in the illustrated embodiment, MUX M is connected to DAC M and MUX M and DAC M are configured to logically connect electrode M to one of operation registers 4M1 through 4MN. Accordingly, MUX M and DAC M are dedicated to electrode M.

When electrode voltage control system 400 is used to cause a manipulation operation to be performed, MUXs 420 receive control signals having operation code data identifying an operation, for example, from a controller. In response to the operation code data, MUXs 420 electrically connect those operation registers of operation registers 410 corresponding with the identified operation of the operation code data to DACs 430.

In addition, to implement the identified operation of the operation code data, at least those operation registers corresponding with the identified operation receive a signal, such as a clock signal, which causes those operation registers to sequentially provide the sequence of stored data values corresponding with the identified operation to the DACs 430 through MUXs 420. Accordingly, DACs 430 receive sequences of stored data values corresponding with the identified operation, and provide corresponding analog voltage sequences to the electrodes. As a result, the electrodes induce electric fields causing the identified operation to be performed and the trapped ions are manipulated according to the identified operation.

Figure 5:
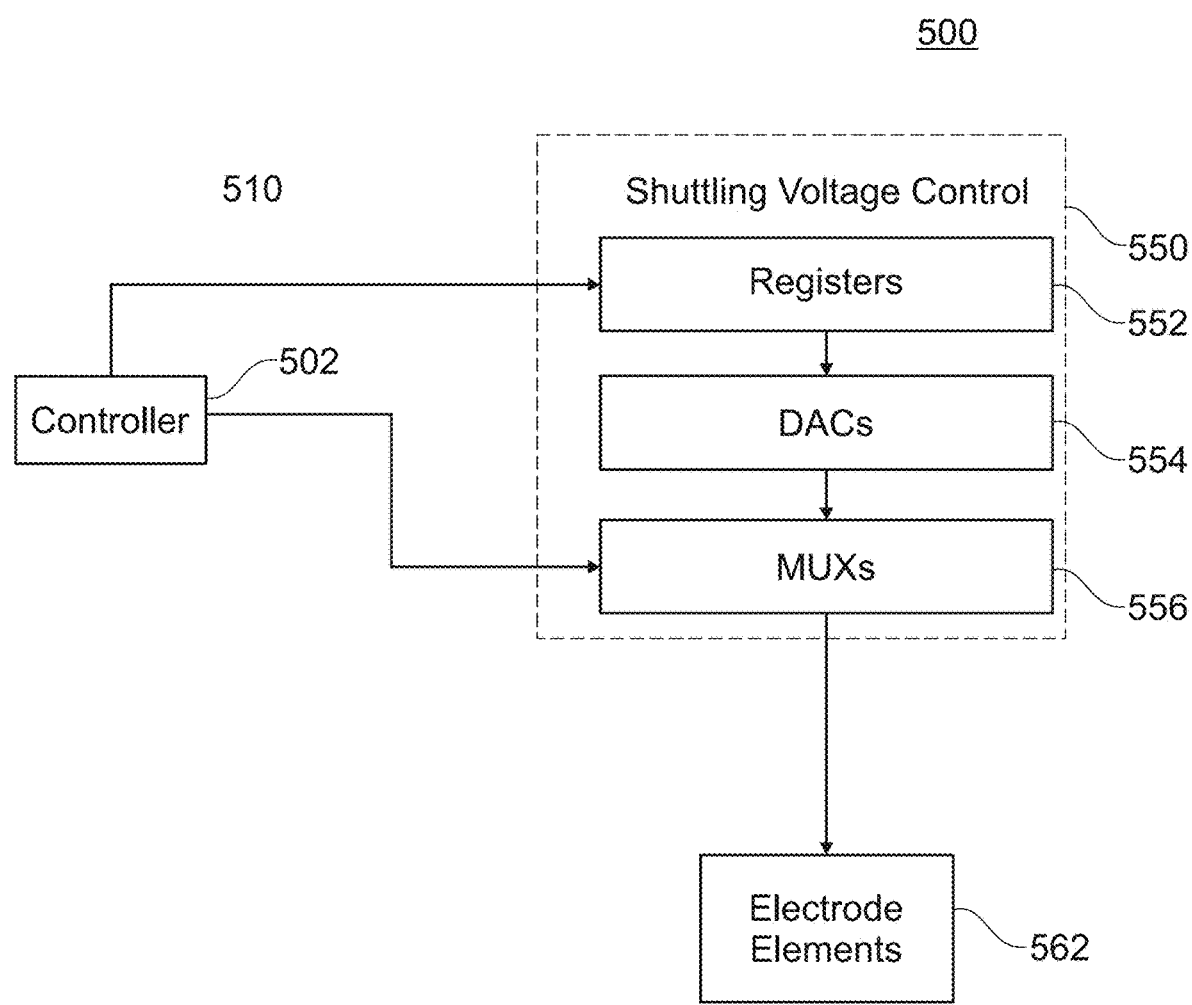
FIG. 5 is a diagram illustrating an ion shuttling control system according to some embodiments.

FIG. 5 is a diagram illustrating an ion shuttling control system 500 according to some embodiments. The ion shuttling control system 500 may have a system controller 502, an electrode voltage control system 550, and electrode elements 562. In general, the system controller may provide data signals to operation registers 552 of electrode voltage control system 550, and may provide control signals having operation code data to MUXs 556 of electrode voltage control system 550.

The electrode voltage control system 550 stores data in operation registers 552, where the data correspond with ion manipulation operations for particular electrodes. The electrode voltage control system 550 has inputs of DACs 554 electrically connected to outputs of the operation registers 552, and generates analog voltages from the data values of the operation registers 552 with DACs 554. The electrode voltage control system 550 also selectively connects outputs of certain DACs 554 to the electrodes with MUXs 556 according to the operation code data from system controller 502, such that the analog voltages of DACs 554 selected based on the operation code data are applied to electrode elements 562 for inducing the electric fields with the electrode elements 562. Furthermore, the induced electric fields cause the identified electrodes to perform ion manipulation operations identified by the operation code data. In some embodiments, the MUXs 556 includes a decoder circuit (not shown) configured to receive the operation code data and to generate a set of switch signals, which cause the switches of the MUXs 556 to electrically connect the correct electrode elements 562 to the correct DACs 554.

In some embodiments, the analog voltage values may include information, data, or values for a neutral voltage profile for holding ions a particular location, or may include information, data or values for shuttling voltages for a voltage profile such as a shuttling voltage profile for moving ions among locations corresponding with shuttling electrodes. Additionally, in some embodiments, the analog voltages may be keeping voltages for maintaining a base, default, or standard bias voltage against which the neutral voltage profiles or shuttling voltage profiles are changed to provide a localized electric field gradient to trap or control the ions.

In some embodiments, each set of control signals having operation code data provided to the MUXs 556 by system controller 502 causes the switches of the MUXs 556 to electrically connect the outputs of DACs 554 identified by or corresponding to the set of control signals to the corresponding electrodes. In some embodiments, the operation code data has a format which directly controls the switches, and decoding is not necessary.

In some embodiments, multiple electrode voltage control systems 550 are used, and a single system controller performs the functions of the system controller 502 for each of the individual electrode voltage control systems 550. In some embodiments, each of the multiple electrode voltage control systems 550 has a separate system controller 502. In addition, a different controller coordinates the functionality of the individual electrode voltage control systems 550 by providing control signals to the system controllers 502 of the individual electrode voltage control systems 550.

In some embodiments, ion shuttling control systems of different types are used. For example, in some embodiments one or more ion shuttling control systems have features similar or identical to those of ion shuttling control system 300, and one or more ion shuttling control systems have features similar or identical to those of ion shuttling control system 500. In some embodiments, ion shuttling control systems having features different than the specific embodiments discussed herein are used.

Accordingly, in some embodiments, the operation registers 552 store data representing analog voltage waveforms which, when applied to the electrodes, cause ions to be moved according to ion manipulation operations preprogrammed in the operation registers 552. In some embodiments, because the operation registers are preprogrammed with data encoding the ion manipulation operation waveforms, the system controller 502 does not generate data encoding the ion manipulation operation waveforms to perform ion manipulation operations and does not transmit such data to the individual electrode voltage control systems 550. Instead, the system controller 502 provides operation code data to the individual electrode voltage control systems 550, where the operation code data enables or causes those operation registers 552 storing data corresponding to the ion manipulation operation of the operation code data to induce analog voltage waveforms at the electrodes so that the ion manipulation operation is performed.

Figure 6:
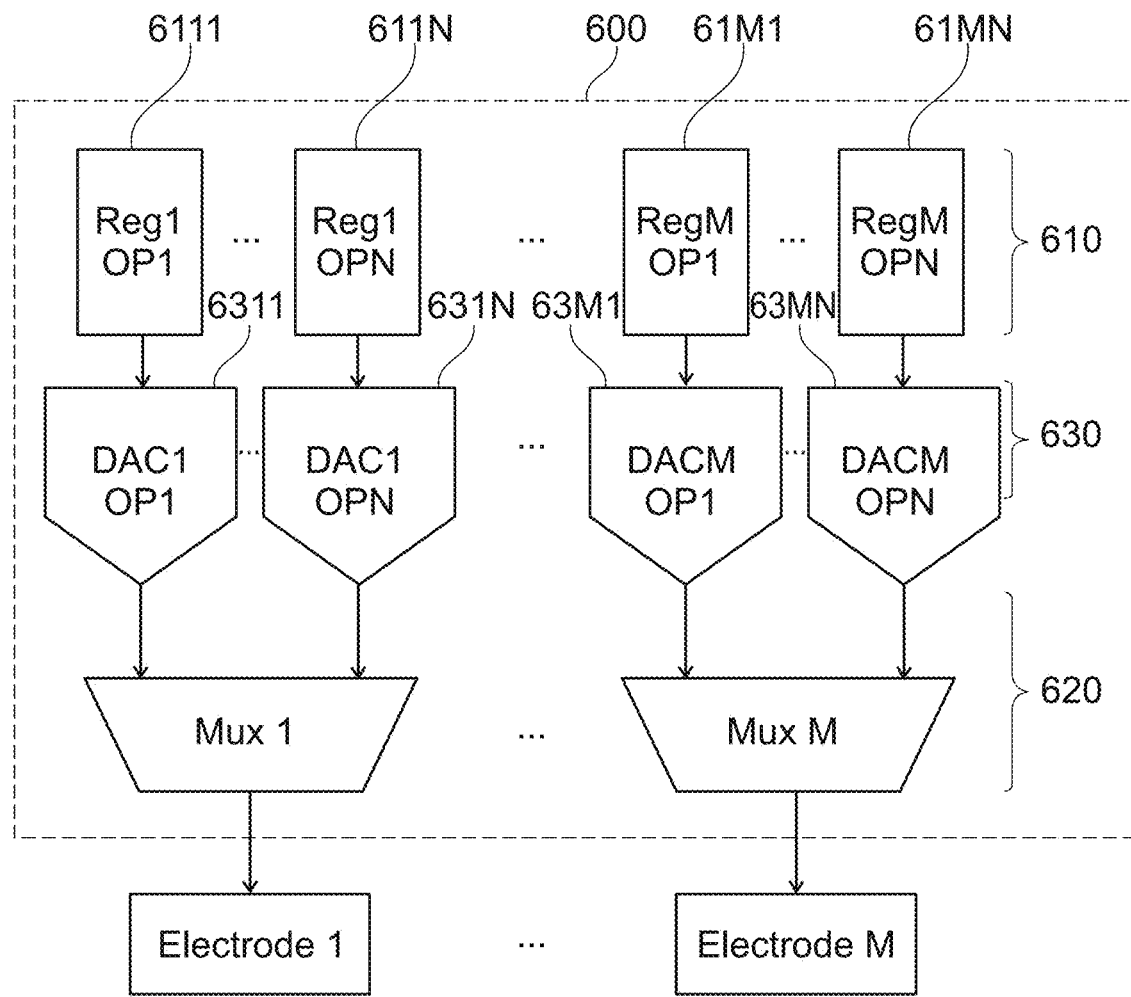
FIG. 6 is a diagram illustrating an electrode voltage control system according to some embodiments.

FIG. 6 is a diagram illustrating an electrode voltage control system 600 according to some embodiments. In some embodiments, an ion trap of ion shuttling control system 500 includes a number of groups of M electrodes 640, and electrode voltage control system 600 may be used in electrode voltage control system 550 to generate voltages for one group of M electrodes 640. In some embodiments, a number of electrode voltage control systems 600 may be used in electrode voltage control system 550 to generate voltages for a corresponding number of groups of M electrodes 640. In some embodiments, an ion trap of ion shuttling control system 500 includes M electrodes 640, and electrode voltage control system 600 may be used as electrode voltage control system 550 in ion shuttling control system 500.

Electrode voltage control system 600 includes operation registers 610 having properties and characteristics similar or identical to those described above with reference to operation registers 552, MUXs 620 having properties and characteristics similar or identical to those described above with reference to MUXs 556, and DACs 630 having properties and characteristics similar or identical to those described above with reference to DACs 564.

Operation registers 610 include multiple sets of operation registers, where each set of operation registers stores data values corresponding with a particular operation selectively performed by or with a group of M electrodes 640, identified as electrode 1 through electrode M. In the illustrated embodiment, operation registers 610 include N sets of operation registers, where each set of operation registers stores data values corresponding with one of N operations.

For example, a first operation register set stores a sequence of data values corresponding with a first operation of the N operations. The first operation register set includes M operation registers, identified as operation registers 6111 through 61M1. Each of the operation registers 6111 through 61M1 stores data corresponding to a sequence of analog voltage values for one of the M electrodes 640. For example, operation register 6111 stores data corresponding to a sequence of analog voltage values for electrode 1 for the first operation, and operation register 61M1 stores data corresponding to a sequence of analog voltage values for electrode M for the first operation.

In addition, an Nth operation register set stores a sequence of data values corresponding with an Nth operation of the N operations. The Nth operation register set includes M operation registers, identified as operation registers 611N through 61MN. Each of the operation registers 611N through 61MN stores data corresponding to a sequence of analog voltage values for one of the M electrodes 640. For example, operation register 611N stores data corresponding to a sequence of analog voltage values for electrode 1 for the Nth operation, and operation register 61MN stores data corresponding to a sequence of analog voltage values for electrode M for the Nth operation.

In the illustrated embodiment, operation registers 6111 through 611N store operation data sequences to be applied to electrode 1 and to no other electrodes. Accordingly, operation registers 6111 through 611N are dedicated to electrode 1. Similarly, in the illustrated embodiment, operation registers 61M1 through 61MN store operation data sequences to be applied to electrode M and to no other electrodes. Accordingly, operation registers 61M1 through 61MN are dedicated to electrode M.

DACs 630 include N×M DACs, logically organized as sets of DACs, where each set of DACs is connected to a corresponding set of operation registers 610 which stores data values corresponding to a particular operation using the electrode 1 through electrode M. In the illustrated embodiment, DACs 630 include N sets of DACs, where each set of DACs is connected to a set of operation registers corresponding with one of the N operations.

For example, a first DAC set is connected to the first operation register set including operation registers 6111 through 61M1, which stores a sequence of data values corresponding with the first operation of the N operations. The first DAC set includes M DACs, identified as DACs 6311 through 63M1. Each of the DACs 6311 through 63M1 generates a sequence of analog voltage values for one of the M electrodes 640. For example, DAC 6311 provides a sequence of analog voltage values for electrode 1 to electrode output 650-1 for the first operation, and DAC 63M1 provides a sequence of analog voltage values for electrode M to electrode output 650-M for the first operation.

In addition, an Nth DAC set is connected to the Nth operation register set including operation registers 611N through 61MN, which stores a sequence of data values corresponding with an Nth operation of the N operations. The Nth DAC set includes M DACs, identified as DACs 631N through 63MN. Each of the DACs 631N through 63MN for one of the M electrodes 640. For example, DAC 631N provides a sequence of analog voltage values for electrode 1 for the Nth operation, and DAC 63MN provides a sequence of analog voltage values for electrode M for the Nth operation.

MUXs 620 include M MUXs, identified as MUX 1 through MUX M. As illustrated, the N inputs of MUX 1 are each connected to one of N DACs 630, where each of the N DACs 630 provide a sequence of analog voltage values to electrode 1 corresponding to a different one of the N operations. Furthermore, the output of MUX 1 is connected to electrode 1. In addition, the N inputs of MUX M are each connected to one of N DACs 630, where each of the N DACs 630 provides a sequence of analog voltage values to electrode M corresponding to a different one of the N operations. Furthermore, the output of MUX M is connected to electrode M.

In the illustrated embodiment, MUX 1 is connected to DACs 6311 through 631N 1 and MUX 1 and DACs 6311 through 631N are configured to logically connect electrode 1 to one of operation registers 6111 through 611N. Accordingly, MUX 1 and DACs 6311 through 631N are dedicated to electrode 1. Similarly, in the illustrated embodiment, MUX M is connected to DACs 63M1 through 63MN and MUX M and DACs 63M1 through 63MN are configured to logically connect electrode M to one of operation registers 61M1 through 61MN. Accordingly, MUX M and DACs 63M1 through 63MN are dedicated to electrode M.

When electrode voltage control system 600 is used to cause a manipulation operation to be performed, MUXs 620 receive control signals having operation code data identifying an operation, for example, from a controller. In response to the operation code data, MUXs 620 electrically connect certain DACs of DACs 630 to the electrodes, where the DACs connected to the electrodes are those DACs which receive data from the operation registers of operation registers 610 having sequences of data corresponding with the identified operation of the operation code data to the electrodes.

In addition, to implement the identified operation of the operation code data, at least those operation registers corresponding with the identified operation receive a signal, such as a clock signal, which causes those operation registers to sequentially provide the sequence of stored data values corresponding with the identified operation to the DACs 630. Accordingly, DACs 630 receive sequences of stored data values corresponding with all of the N operations, and the MUXs provide analog voltage sequences to the electrodes which correspond with the identified operation. As a result, the electrodes induce electric fields causing the identified operation to be performed and the trapped ions are manipulated according to the identified operation.

Figure 7:
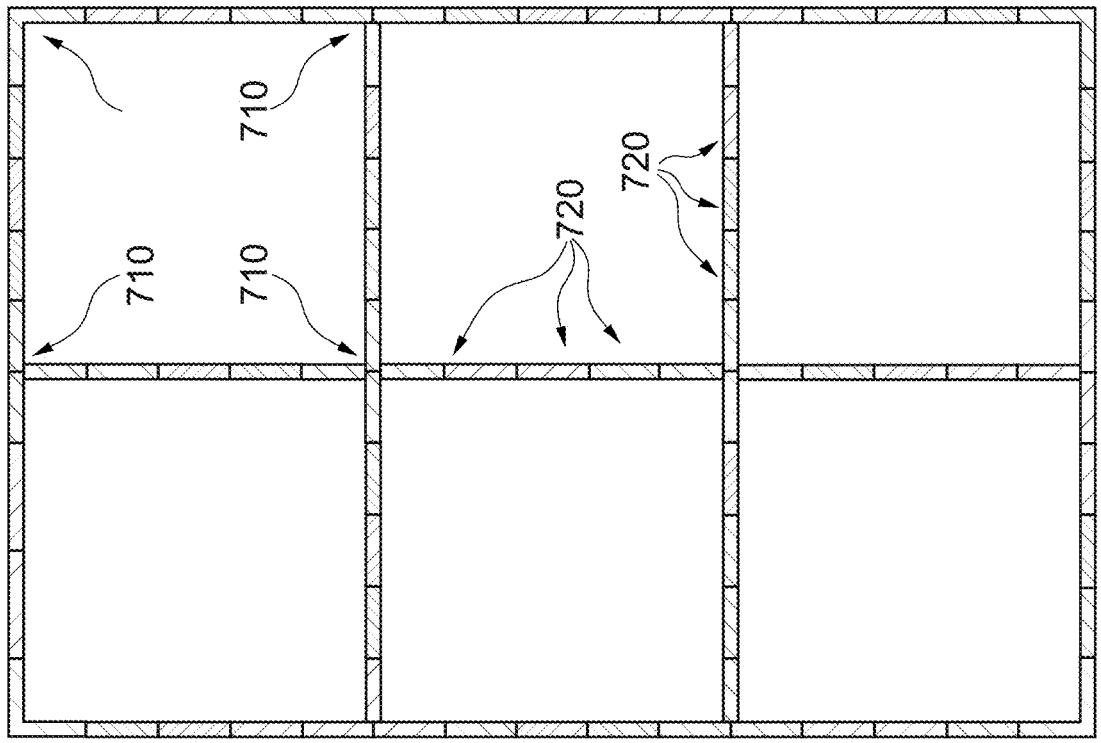
FIG. 7 is a schematic diagram of an ion trap at a particular state of ion manipulation operations according to some embodiments.

FIG. 7 is a schematic diagram of an ion trap 700 at a particular state of ion manipulation operations according to some embodiments. Ion trap 700 may be used, for example, for a quantum computing system. Ion trap 700 includes junctions 710 and locations 720 connected between junctions.

In the illustrated embodiment, each leg of locations 720 between the junctions 710 includes three locations 720. In some embodiments, different numbers of locations 720 between the junctions 710 may be used. For example, in some embodiments, horizontal legs between the junctions 710 have a first number of locations, and vertical legs between the junctions 710 have a second number of locations, wherein the first and second numbers are different.

Each junction 710 has a first number of electrodes placed along the junction 710, and the electrodes are connected to an ion shuttling control system having properties similar or identical to the ion shuttling control systems described herein. For example, an ion shuttling control system configured to simultaneously generate a first number of sequences of analog voltages may apply sequences of analog voltages to each of the electrodes of the junction 710.

Each location 720 has a second number of electrodes placed along the location 720, and the electrodes are connected to an ion shuttling control system having properties similar or identical to the ion shuttling control systems described herein. For example, an ion shuttling control system configured to simultaneously generate a second number of sequences of analog voltages may apply sequences of analog voltages to each of the electrodes of the location 720.

In some embodiments, more electrodes are placed along junctions 710 than are placed along locations 720.

As illustrated, ion trap 700 performs ion manipulation operations at each junction 710 and at each location 720. In some embodiments, operations may be performed at only a portion of the ion trap at a particular time. As shown, these operations include a static operation, an accelerate operation, a move operation, a break operation, a junction straight operation, and a junction turn operation. In the illustration, which type of operation being performed at each junction 710 and at each location 720 are indicated.

Accordingly, as illustrated, the ion shuttling control system connected to each of the junctions 710 causes the electrodes of the junction 710 connected thereto to perform either a junction straight operation or a junction turn operation according to principles discussed elsewhere herein. Similarly, as illustrated, the ion shuttling control system connected to each of the locations 720 causes the electrodes of the location 720 connected thereto to perform one of a static operation, and accelerate operation, a move operation, and a break operation according to principles discussed elsewhere herein.

In some embodiments, each location 720 corresponds with a functional zone or a portion of a functional zone for the quantum computing system. For example, one or more locations 720 may correspond with any of a read-out zone, a memory zone, a processing zone, and one or more other types of zones. In some embodiments, one or more groups of connected locations 720 correspond with a single functional zone. Once the operations are completed, the functional zones may be used by the quantum computing system according to their various functions.

Figure 8:
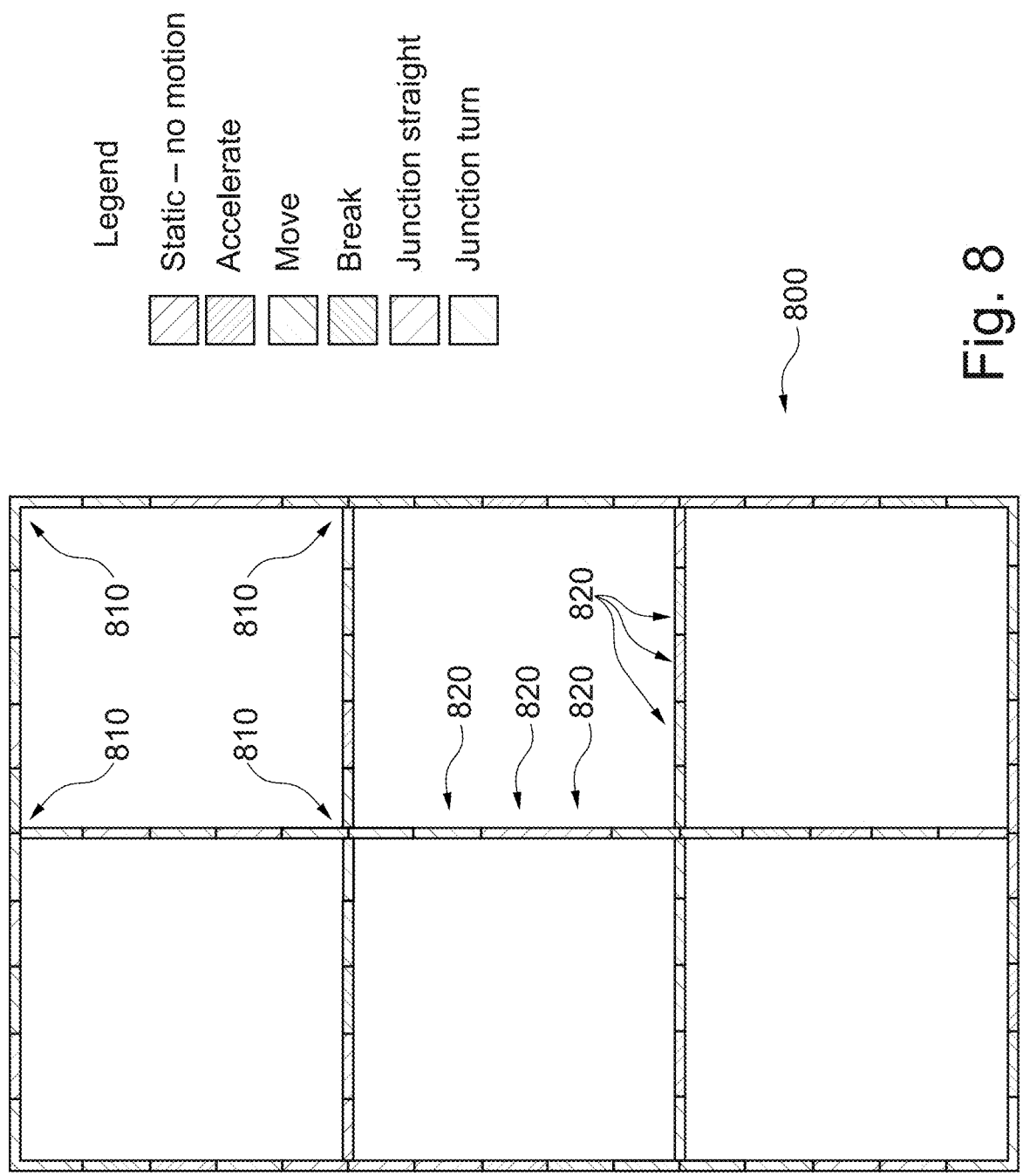
FIG. 8 is a schematic diagram of ion trap at a different state of ion manipulation operations according to some embodiments.

FIG. 8 is a schematic diagram of ion trap 700 at a different state of ion manipulation operations according to some embodiments. As illustrated, ion trap 700 performs a number of ion manipulation operations, for example, after the quantum computing system uses the functional zones according to their various functions.

As illustrated in FIG. 8, an operation is performed at each junction 710 and at each location 720 that are different from the operations performed in ion trap 700 illustrated in FIG. 7. Once the operations are completed, the functional zones may be used by the quantum computing system according to their various functions.

Accordingly, the ion shuttling control system connected to each of the junctions 710 causes the electrodes of the junction 710 connected thereto to perform either a junction straight operation or a junction turn operation according to principles discussed elsewhere herein, where the performed operation may be the same or different from that shown in FIG. 7. Similarly, as illustrated, the ion shuttling control system connected to each of the locations 720 is causing the electrodes of the location 720 connected thereto to perform one of a static operation, and accelerate operation, a move operation, and a break operation according to principles discussed elsewhere herein, where the performed operation may be the same or different from that shown in FIG. 7.

Figure 9:
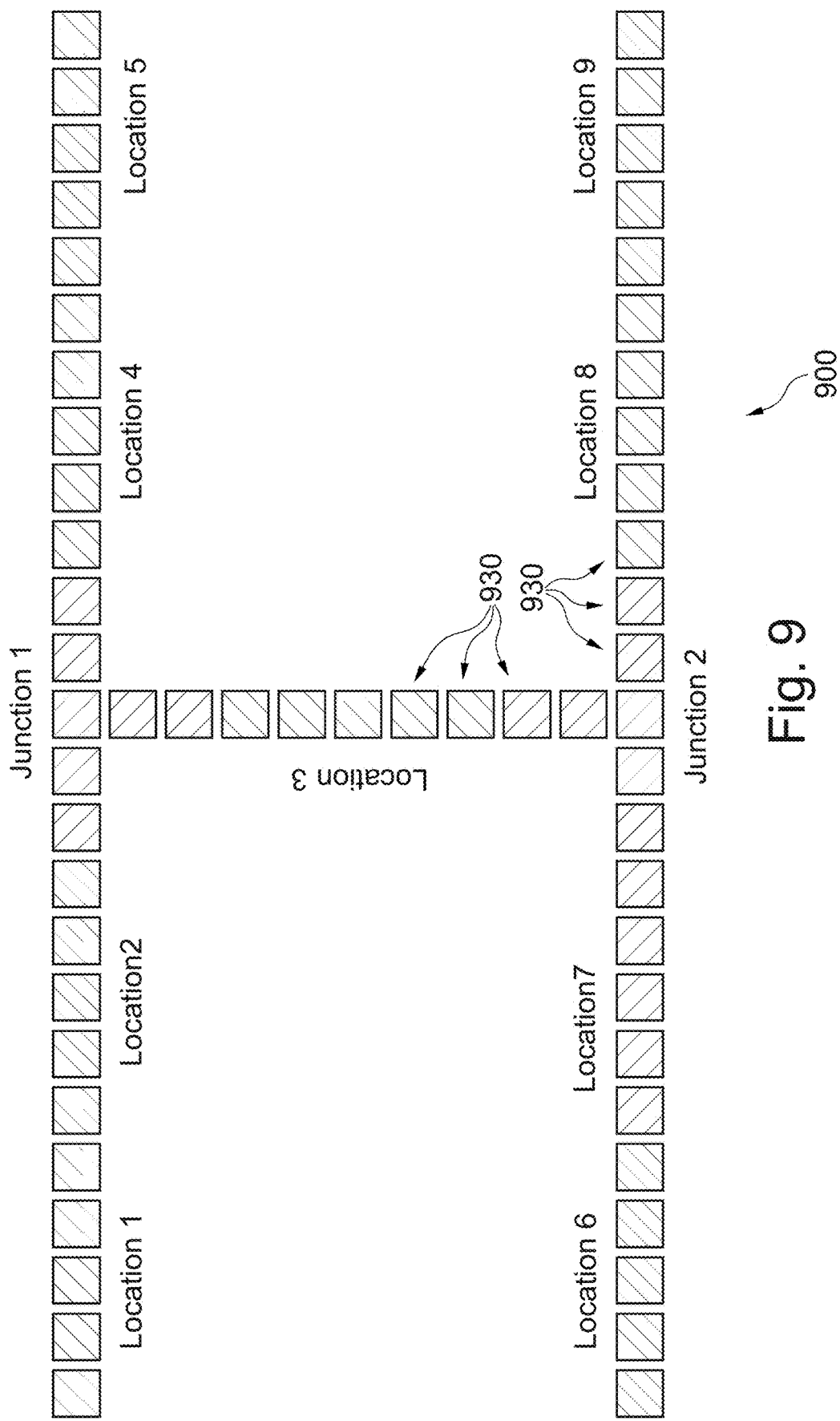
FIG. 9 is a schematic diagram of a portion of an ion trap.

FIG. 9 is a schematic diagram of a portion of an ion trap 900. Ion trap 900 may be used, for example, for a quantum computing system. Ion trap 900 includes junctions and locations connected between junctions. In the illustrated embodiment, each location between the junctions includes five electrodes 930. In some embodiments, different numbers of electrodes 930 are used for each location. In some embodiments, each location corresponds with a functional zone or a portion of a functional zone for the quantum computing system. In the illustrated embodiment, each junction includes seven electrodes 930. In some embodiments, different numbers of electrodes 930 are used for each junction.

Figure 10:
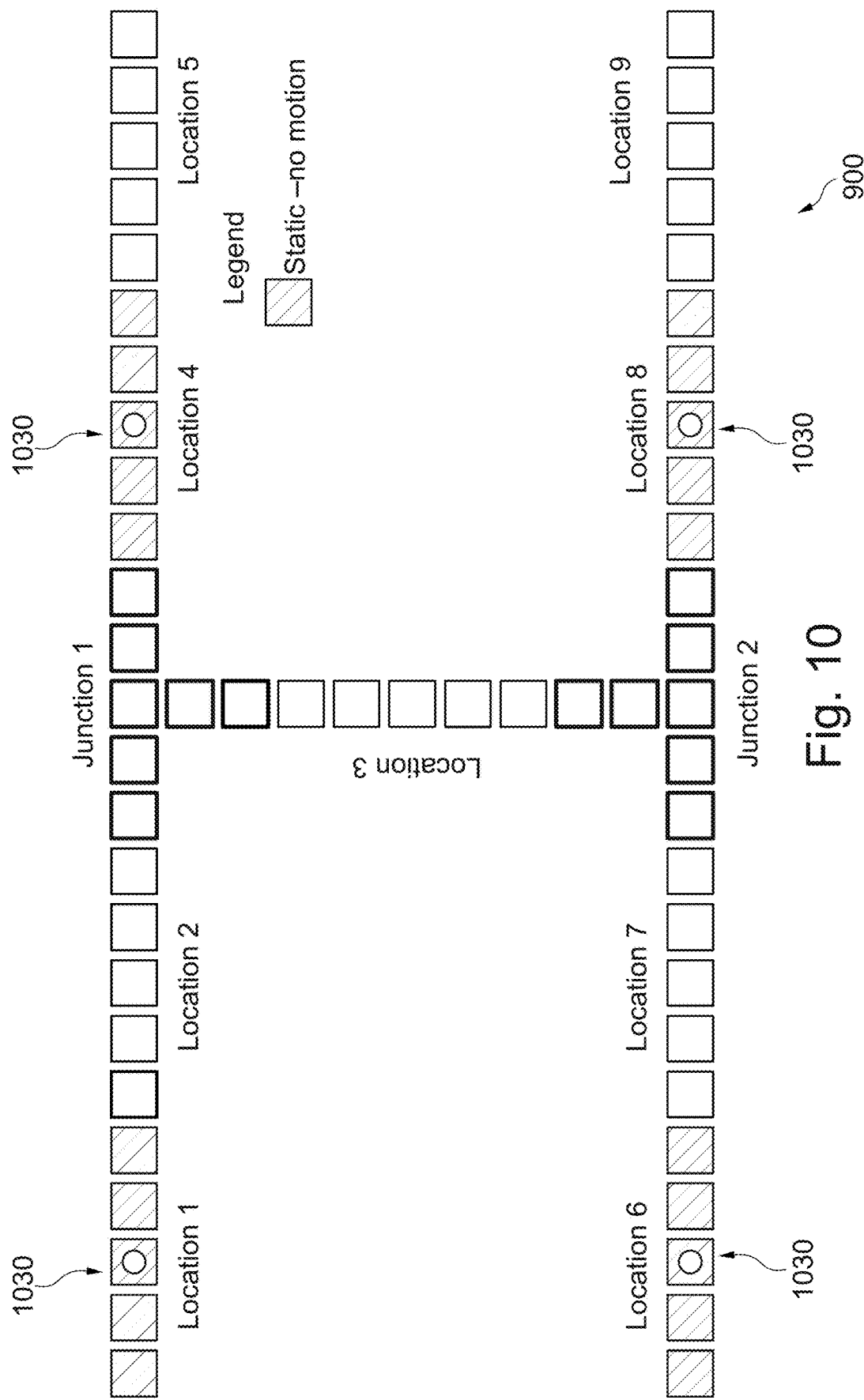
FIG. 10 is a schematic diagram of the portion of the ion trap performing an operation on ions or ion strings.

FIG. 10 is a schematic diagram of the portion of the ion trap 900 performing an operation on ions or ion strings 1030. In the illustrated embodiment, locations 1, 4, 6, and 8 are used to perform a static operation. Accordingly, the ion shuttling control system respectively connected to each of the locations 1, 4, 6, and 8 causes the electrodes of the locations 1, 4, 6, and 8 to perform a static operation according to principles discussed elsewhere.

Figure 11:
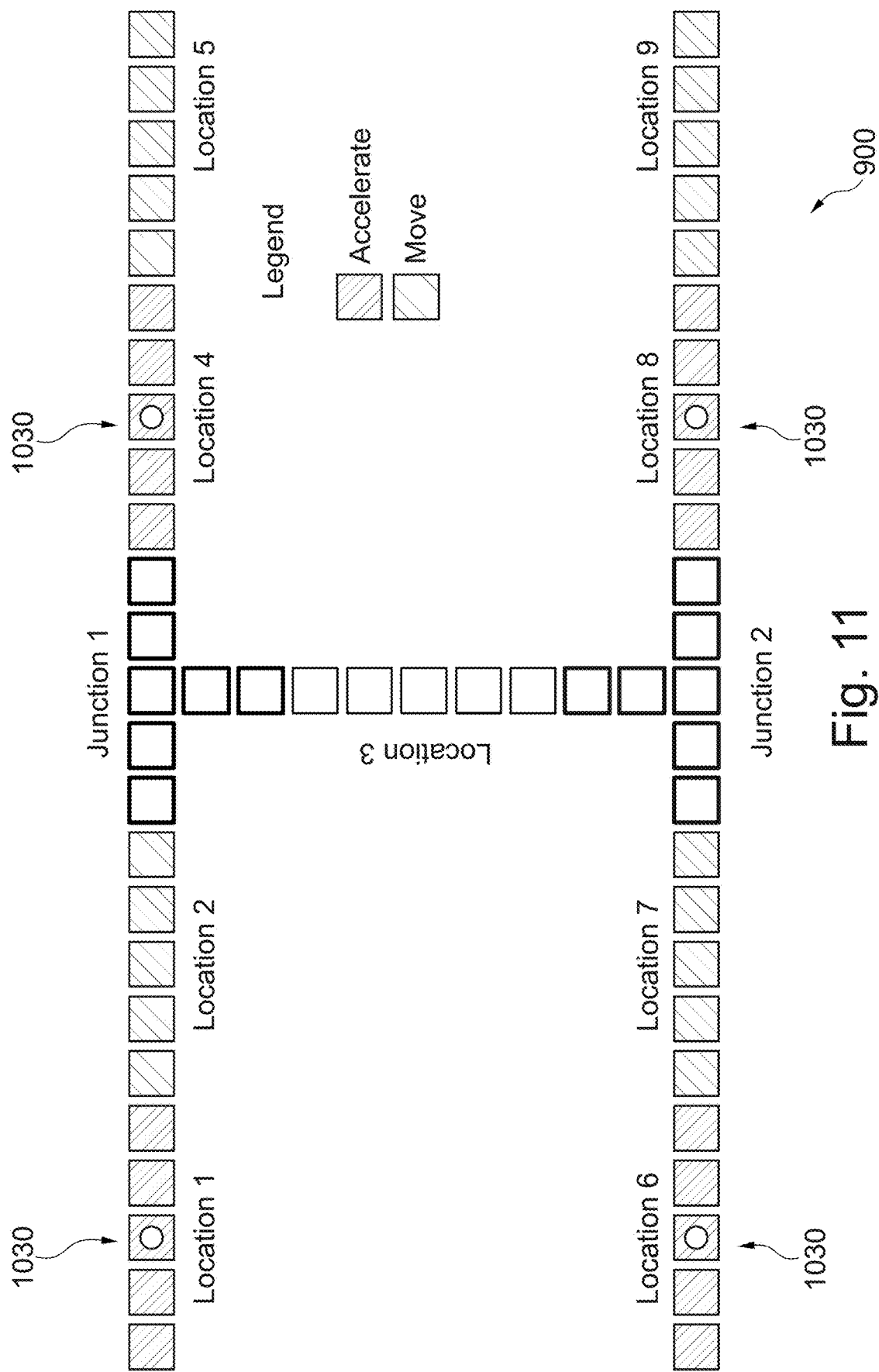
FIG. 11 is a schematic diagram of the portion of the ion trap performing an operation on ions or ion strings.

FIG. 11 is a schematic diagram of the portion of the ion trap 900 performing an operation on ions or ion strings 1030. In the illustrated embodiment, locations 1, 4, 6, and 8 are used to perform an accelerate operation, and locations 2, 5, 7, and 9 are used to perform a move operation. Accordingly, the ion shuttling control system respectively connected to each of the locations 1, 4, 6, and 8, is causing the electrodes of the locations 1, 4, 6, and 8 to perform an accelerate operation, and the ion shuttling control system respectively connected to each of the locations 2, 5, 7, and 9 is causing the electrodes of the locations 2, 5, 7, and 9 to perform a move operation, according to principles discussed elsewhere.

Figure 12:
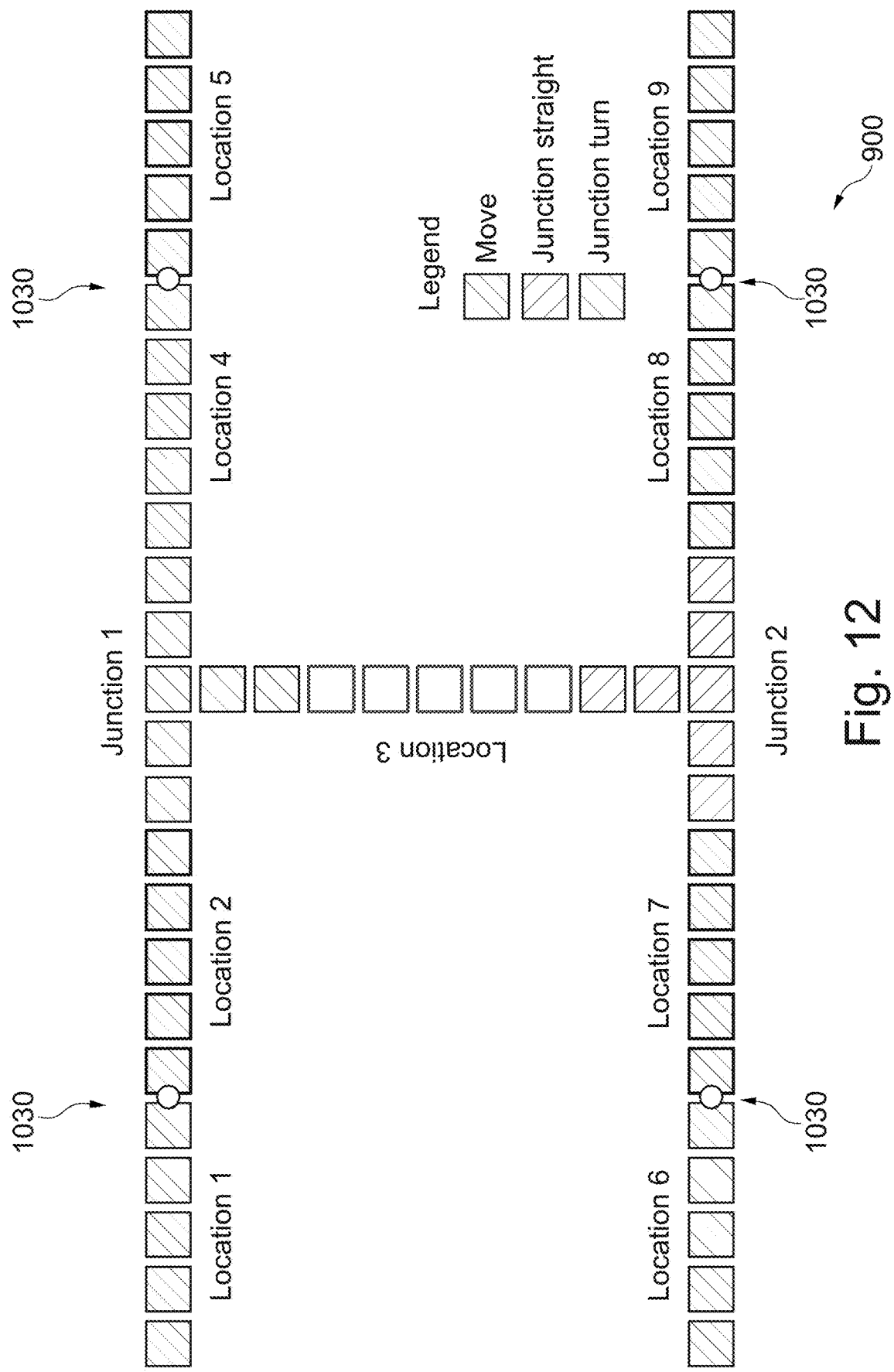
FIG. 12 is a schematic diagram of the portion of the ion trap performing an operation on ions or ion strings.

FIG. 12 is a schematic diagram of the portion of the ion trap 900 performing an operation on ions or ion strings 1030. In the illustrated embodiment, locations 1, 2, 4, 5, 6, 7, 8, and 9 are used to perform a move operation, junction 1 is used to perform a junction turn right operation, and junction 2 is used to perform a junction straight operation. Accordingly, the ion shuttling control system respectively connected to each of the locations 1, 2, 4, 5, 6, 7, 8, and 9 is causing the electrodes of the locations 1, 2, 4, 5, 6, 7, 8, and 9 to perform a move operation, the ion shuttling control system connected to junction 1 is causes the electrodes of junction 1 to perform a turn right operation, and the ion shuttling control system connected to junction 2 is causing the electrodes of junction 2 to perform a junction straight operation, according to principles discussed elsewhere.

Figure 13:
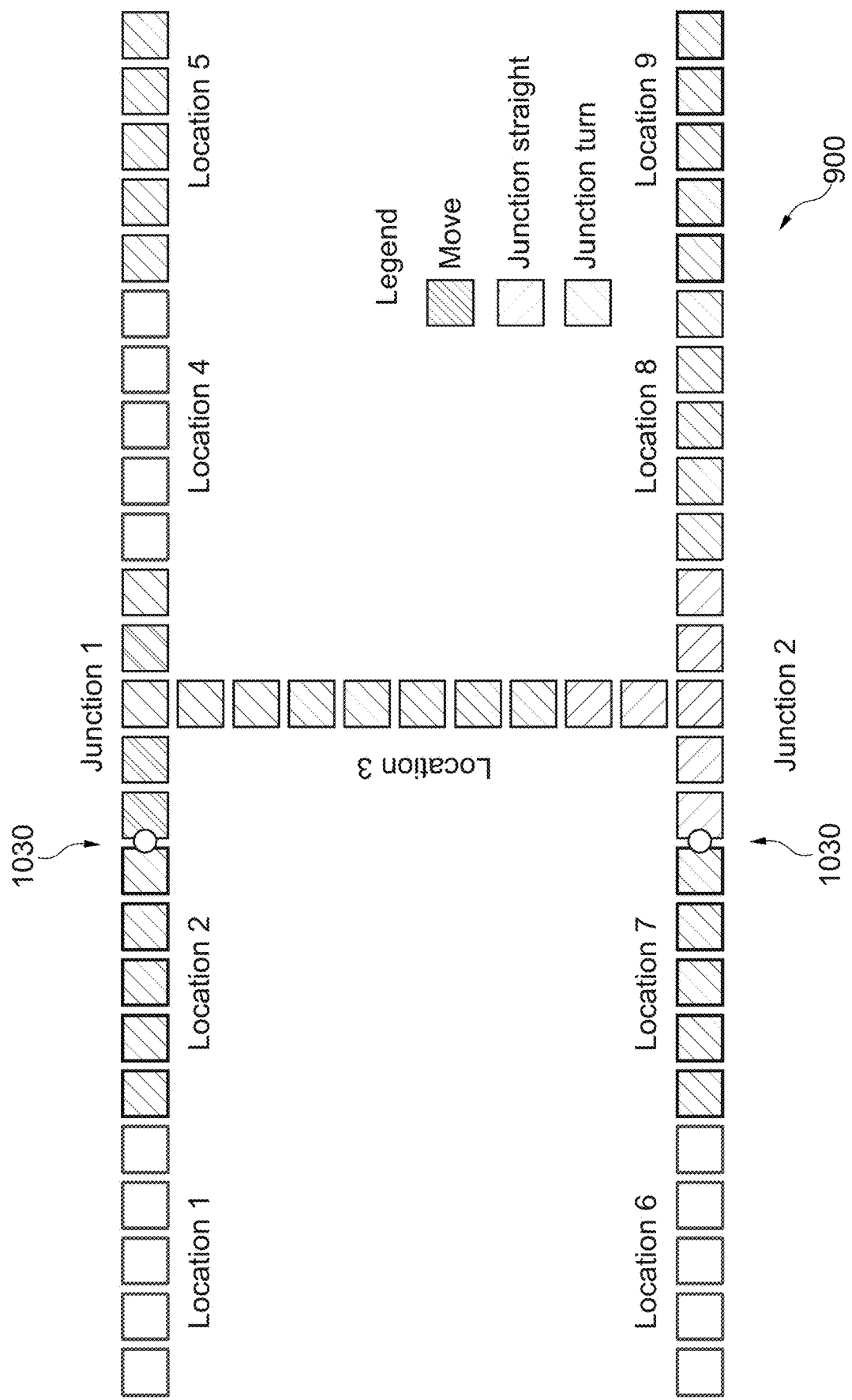
FIG. 13 is a schematic diagram of the portion of the ion trap performing an operation on ions or ion strings.

FIG. 13 is a schematic diagram of the portion of the ion trap 900 performing an operation on ions or ion strings 1030. In the illustrated embodiment, locations 2, 3, 5, 7, 8, and 9 are used to perform a move operation, junction 1 is used to perform a junction turn right operation, and junction 2 is used to perform a junction straight operation. Accordingly, the ion shuttling control system respectively connected to each of the locations 2, 3, 5, 7, 8, and 9 is causing the electrodes of the locations 2, 3, 5, 7, 8, and 9 to perform a move operation, the ion shuttling control system connected to junction 1 is causing the electrodes of junction 1 to perform a turn right operation, and the ion shuttling control system connected to junction 2 causes the electrodes of junction 2 to perform a junction straight operation, according to principles discussed elsewhere.

Figure 14:
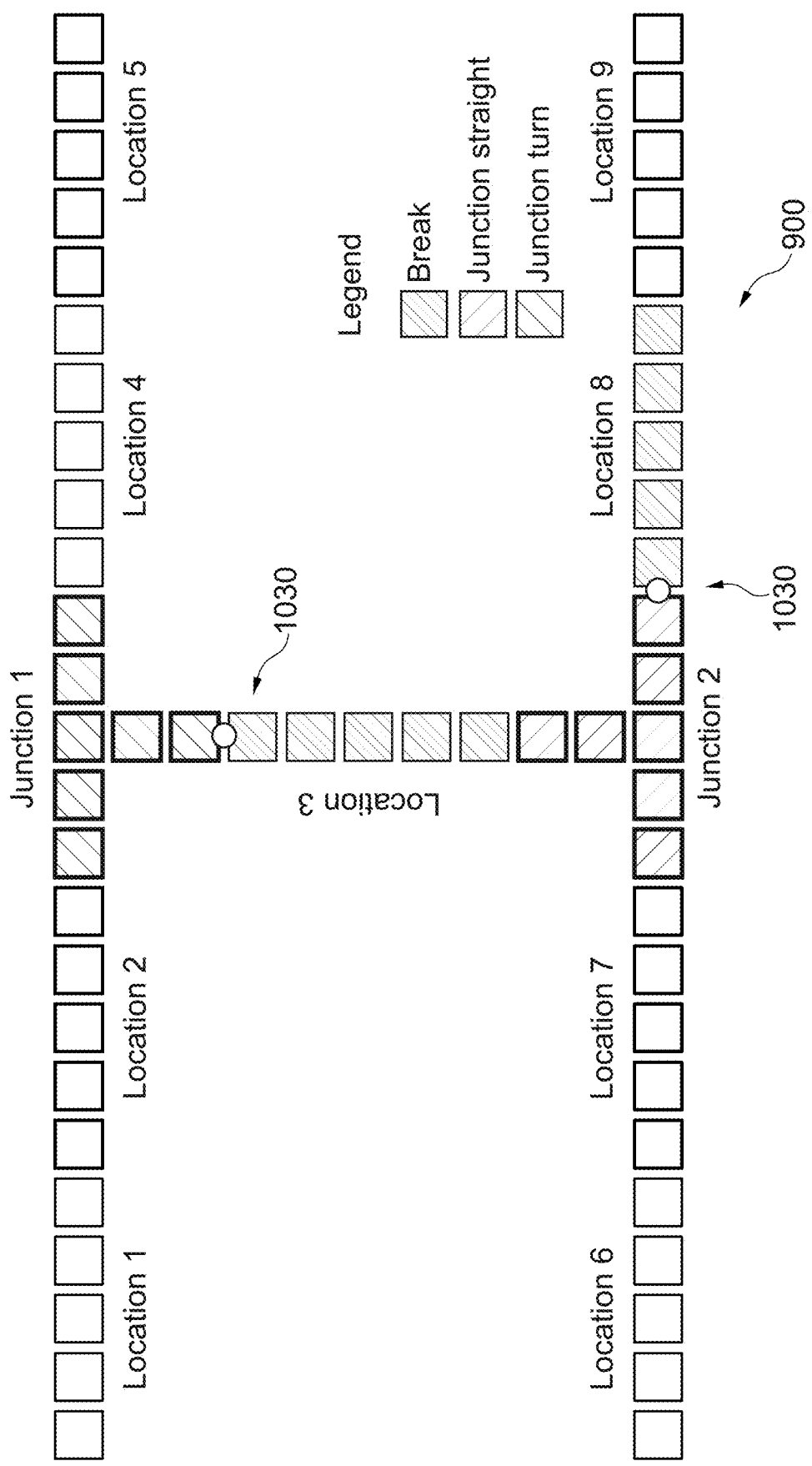
FIG. 14 is a schematic diagram of the portion of the ion trap performing an operation on ions or ion strings.

FIG. 14 is a schematic diagram of the portion of the ion trap 900 performing an operation on ions or ion strings 1030. In the illustrated embodiment, locations 3 and 8 are used to perform a break operation, junction 1 is used to perform a junction turn right operation, and junction 2 is used to perform a junction straight operation. Accordingly, the ion shuttling control system respectively connected to each of the locations 3 and 8 is causing the electrodes of the locations 3 and 8 to perform a break operation, the ion shuttling control system connected to junction 1 causes the electrodes of junction 1 to perform a turn right operation, and the ion shuttling control system connected to junction 2 is causing the electrodes of junction 2 to perform a junction straight operation, according to principles discussed elsewhere.

In some embodiments, certain ion manipulation operations use more time than other ion manipulation operations. For example, in some embodiments, ion manipulation operations performed by junctions may use more time than other ion manipulation operations. In some embodiments, the ion shuttling control systems are coordinated such that multiple shorter duration operations are performed while a longer duration operation is performed. In some embodiments, the ion shuttling control systems are coordinated such that each type of operation is allotted an integer number of timeslots. For example, a move operation for a location may be allotted a single timeslot, and a turn right operation for a junction may be allotted 5, 10, or another integer number of timeslots. In addition, in some embodiments, boundaries of timeslots for operations are aligned.

Figure 15:
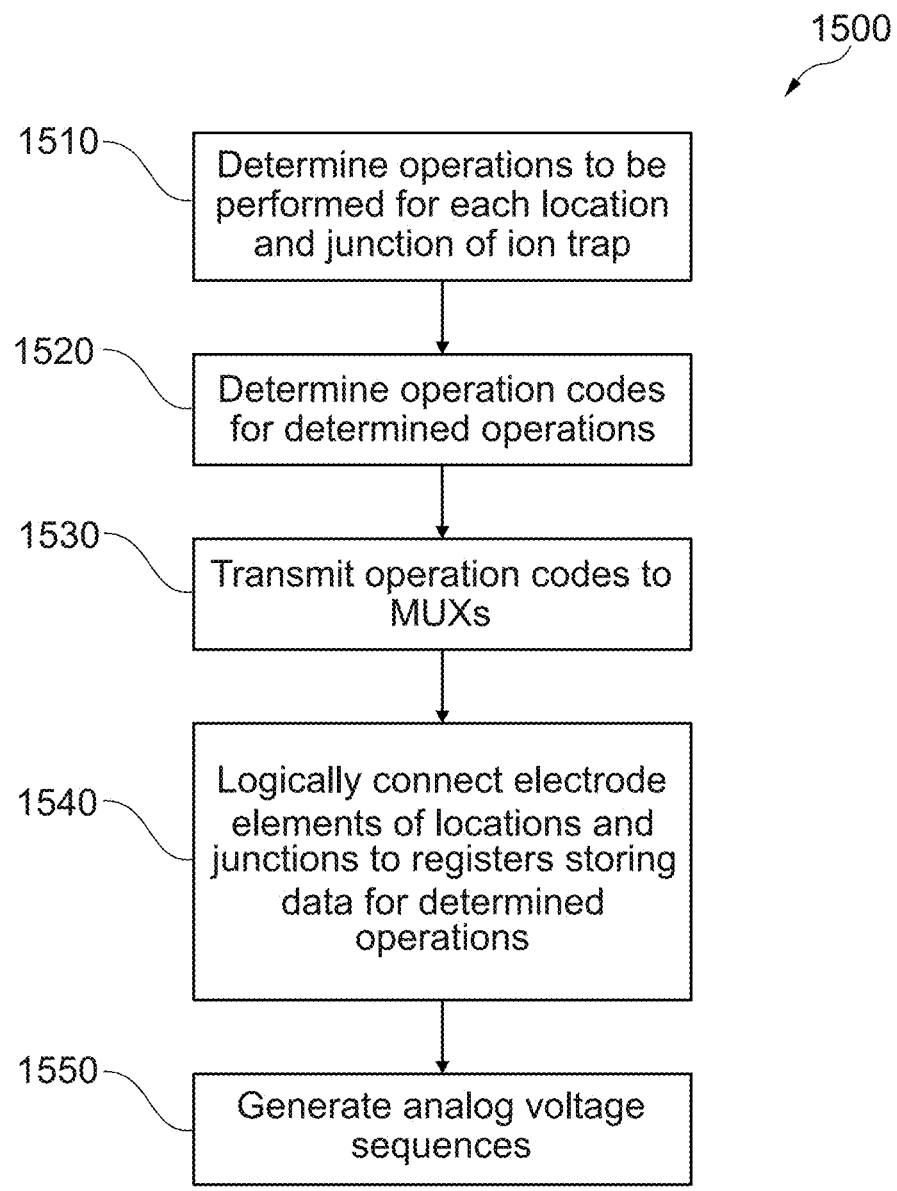
FIG. 15 is a flow diagram illustrating a method of controlling ion movement according to some embodiments.

FIG. 15 is a flow diagram illustrating a method 1500 of controlling ion movement according to some embodiments. The method 1500 may be performed by an ion shuttling control system, such as those discussed herein. In some embodiments, the method 1500 is performed by a group of coordinated ion shuttling control systems, such as those discussed herein.

At step 1510, a controller determines ion manipulation operations to be performed at multiple locations and junctions of an ion trap, where at least some of the locations have a trapped ion or a trapped ion string. The controller may determine the ion manipulation operations to be performed based on, for example, one or more instructions to be executed as part of an application for a quantum computing system.

At step 1520, the controller determines operation codes for the operations determined at step 1510. For example, the controller may be configured to cause any of N operations to be performed, and each of the N operations may be identified by a unique operation code. At step 1520, the controller determines or accesses those operation codes of the N operation codes which are for the operations determined at step 1510.

At step 1530, the controller provides control signals having the operation codes to the MUXs.

At step 1540, the MUXs logically connect the electrode elements to operation registers storing data for the operations determined at step 1510. In some embodiments, the operation codes or the control signals are used to control switches of the MUXs to logically connect the electrode elements to the proper operation registers. In some embodiments, the operation codes or the control signals are decoded to generate switch signals which are used to control the switches of the MUXs to logically connect the electrode elements to the proper operation registers.

At step 1550, analog voltage sequences generated by DACs are provided to the electrode elements. In response to the analog voltage sequences, the operations determined at step 1510 are performed at the appropriate locations and junctions of the ion trap.

Figure 16:
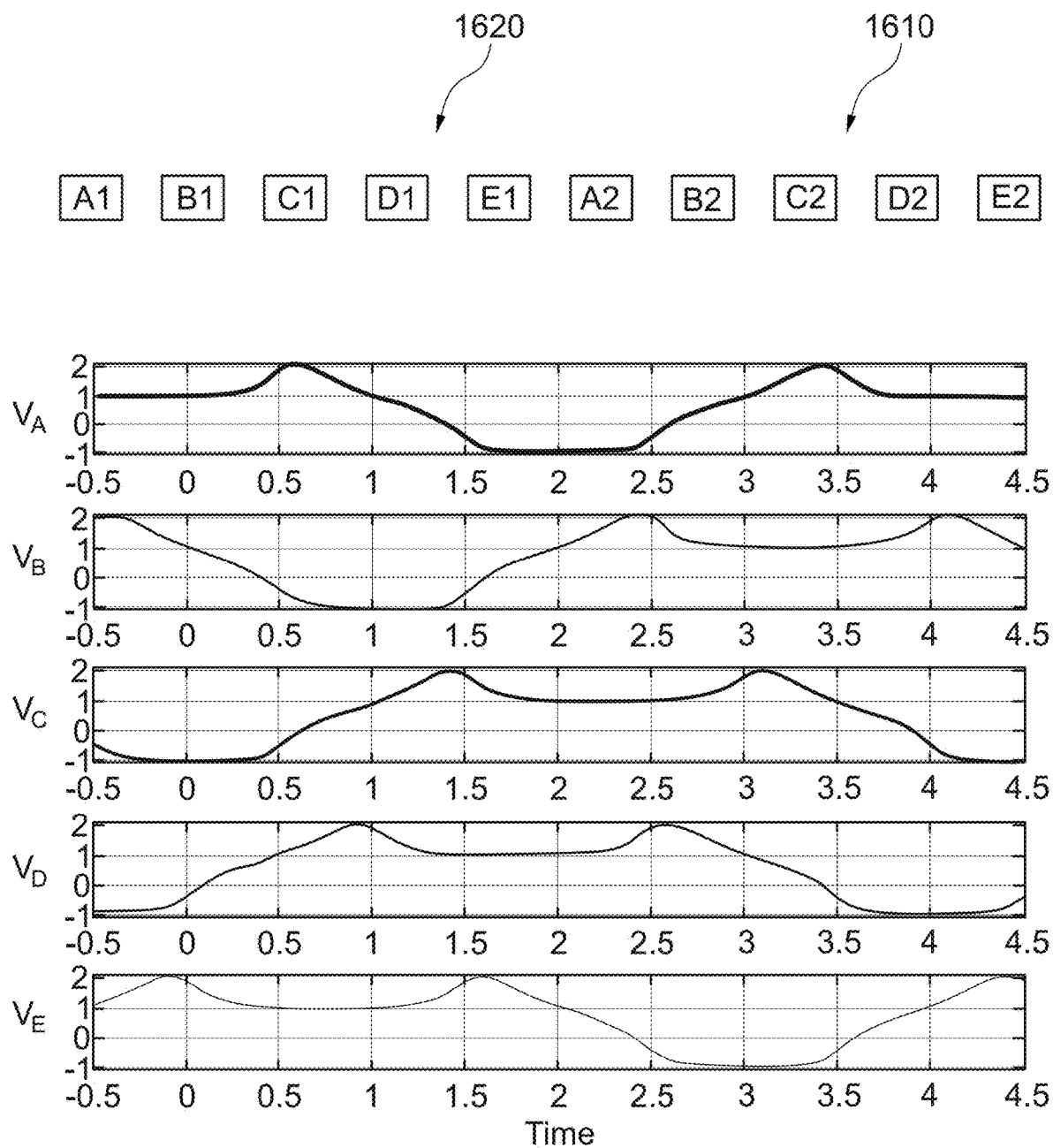
FIG. 16 illustrates waveform diagrams for shuttling ions between locations according to some embodiments.

FIG. 16 illustrates voltage waveforms VA-VE which for shuttling ions between locations 1610 and 1620 according to some embodiments. Voltage waveforms VA-VE, may be applied to electrodes A1-E1 of location 1610 and to electrodes A2-E2 of location 1620 to move an ion from right to left in the illustration. Voltage waveform VA may be applied to electrodes A1 and A2, voltage waveform VB may be applied to electrodes B1 and B2, voltage waveform VC may be applied to electrodes C1 and C2, voltage waveform VD may be applied to electrodes D1 and D2, and voltage waveform VE may be applied to electrodes E1 and E2. Because of the electric fields induced by the electrodes, where a positive ion is more attracted to the lower voltages and is more repelled from the higher voltages, the positive ion is moved or shuttled from right to left in the illustration, from location 1610 to 1620.

The illustrated voltage waveforms are particular examples, and are not limiting, as other voltage waveforms may be used to shuttle ions. For example, in some embodiments, other voltage waveforms and other combinations of voltage waveforms may be used to perform the ion manipulation operations discussed herein.

Figure 17:
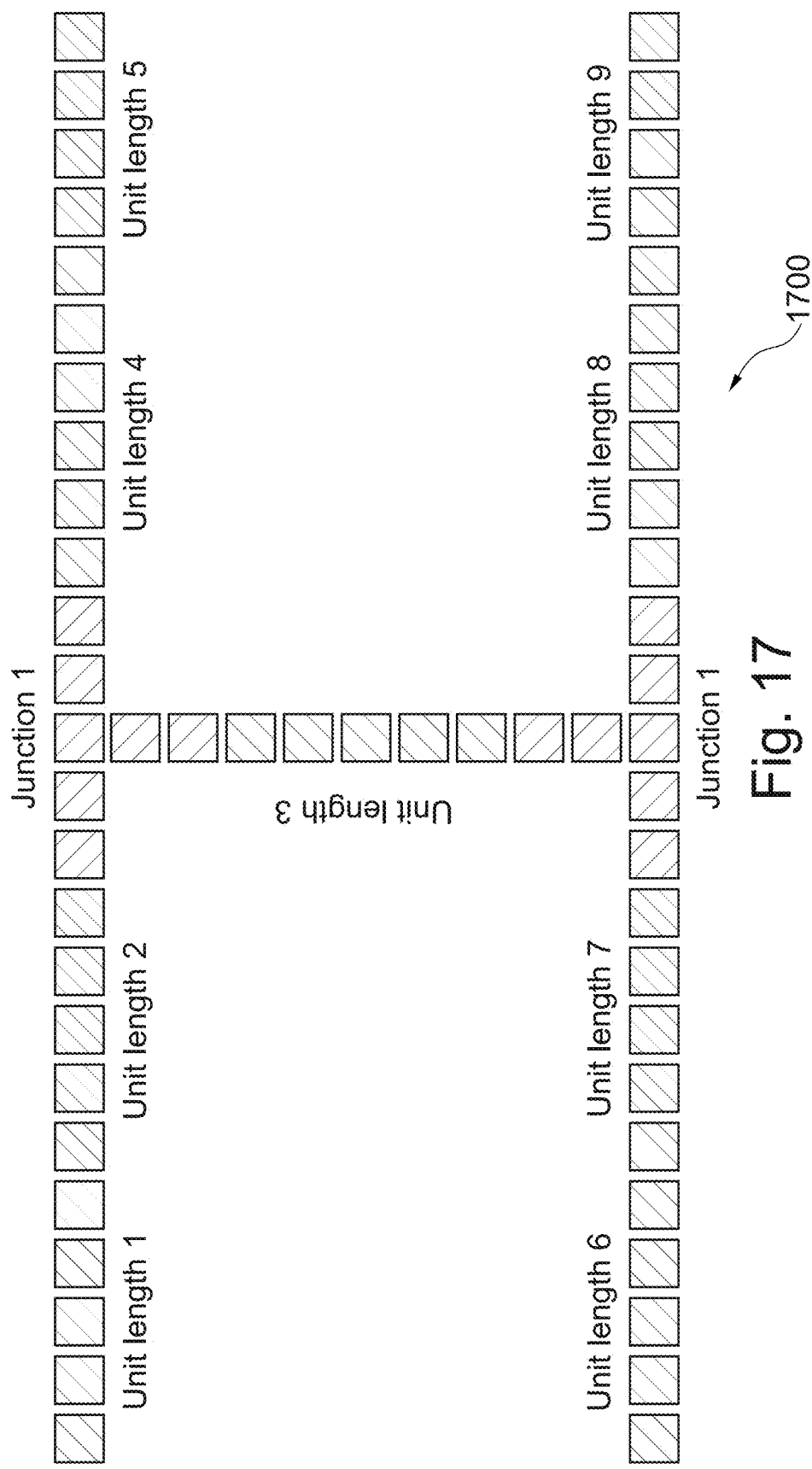
FIG. 17 is a schematic diagram of a portion of an ion trap according to some embodiments.

FIG. 17 is a schematic diagram of a portion 1700 of an ion trap. As illustrated, each location has a unit length which is the same size. In this embodiment, each location has a size of 5 electrodes. In alternative embodiments, each unit length or location has a different number of electrodes. For example, in some embodiments each unit length has a size of 3, 5, 7, 9 or another number of electrodes. In some embodiments, each unit length has an even number of electrodes. In some embodiments, hundreds, or thousands of locations have the same size.

As illustrated, each junction has a unit length which is the same size. In this embodiment, each junction extends 2 electrodes from a central junction electrode. In alternative embodiments, each junction has a different number of electrodes. For example, in some embodiments each junction extends 1, 3, 4, 5, or another number of electrodes from the central junction electrode. In some embodiments, hundreds, or thousands of junctions have the same size. In some embodiments, the junctions are sized to have straight through pads which have the same size as the size of the locations.

In some embodiments, an ion trap has one or more regions, for example having different functionality, in which locations and junctions have different sizes. For example, a first location may have a first size, and a second adjacent location in the region may have a second size. Accordingly, the performance of the operations in the one or more regions is optimized or about optimized for throughput.

In some embodiments, an ion trap has one or more regions, for example having different functionality, in which locations and junctions have matching sizes which are different than the sizes of the locations in junctions of one or more other regions. For example, regions used for ion splitting may have smaller electrode sizes, and the unit length may be physically smaller. Similarly, regions used only for shuttling over long distances may have larger electrodes, and the unit length may be physically larger.

Some embodiments benefit from their locations and junctions having the same size at least partly because successive operations throughout the ion trap may be synchronized in a sequence of timeslots. For example, in some embodiments, during a first timeslot, a first set of operations are performed at many or all of the locations and junctions in the ion trap, where the first timeslot has sufficient duration for all of the first operations. In addition, during a second timeslot, a second set of operations are performed at many or all of the locations and junctions in the ion trap, where the second timeslot has sufficient duration for all of the second operations. In some embodiments, all of the timeslots in a sequence of timeslots have the same duration, such that the timeslots are periodic.

Accordingly, even though some of the operations may finish earlier than others within a particular timeslot, or may otherwise require less time than the duration of the timeslot, the operations across the ion trap are synchronized such that each location and junction performs one operation per timeslot, regardless of which operation is being performed.

In some embodiments, some individual operations may require more than one timeslot. For example, some individual operations may be allocated two, three, four, five, or another integer number of timeslots for completion.

In some embodiments, an ion trap has one or more regions, for example having different functionality, in which locations and junctions perform operations where the sequencing of operations is performed without timeslots. For example, a first operation may have a first duration, and a second operation in the same location may have a second duration. Accordingly, the performance of the operations in the one or more regions is optimized or about optimized for throughput.

In some embodiments, an ion trap has one or more regions, for example having different functionality, in which locations and junctions in the specialized region may perform operations using timeslots of different durations than the timeslots of one or more other regions.

Synchronized operations allowed for large-scale computing systems, for example, at least because the compiler or controller does not need to optimize the set of operations to be performed based on the duration of each operation. Without the computational load of optimizing the set of operations, the compiler or controller is able to manage large numbers of operations being performed in each of the sequence of timeslots.

In some embodiments, the size of locations and junctions and the duration of timeslots may be related. For example, the size of locations and junctions may be sufficient that the electrodes that control an ion string do not affect the neighboring ion strings significantly.

In some embodiments, each location and junction is occupied by a single ion or ion string. In some embodiments, one or more locations or junctions is occupied by more than one ion or ion string.

Figure 18:
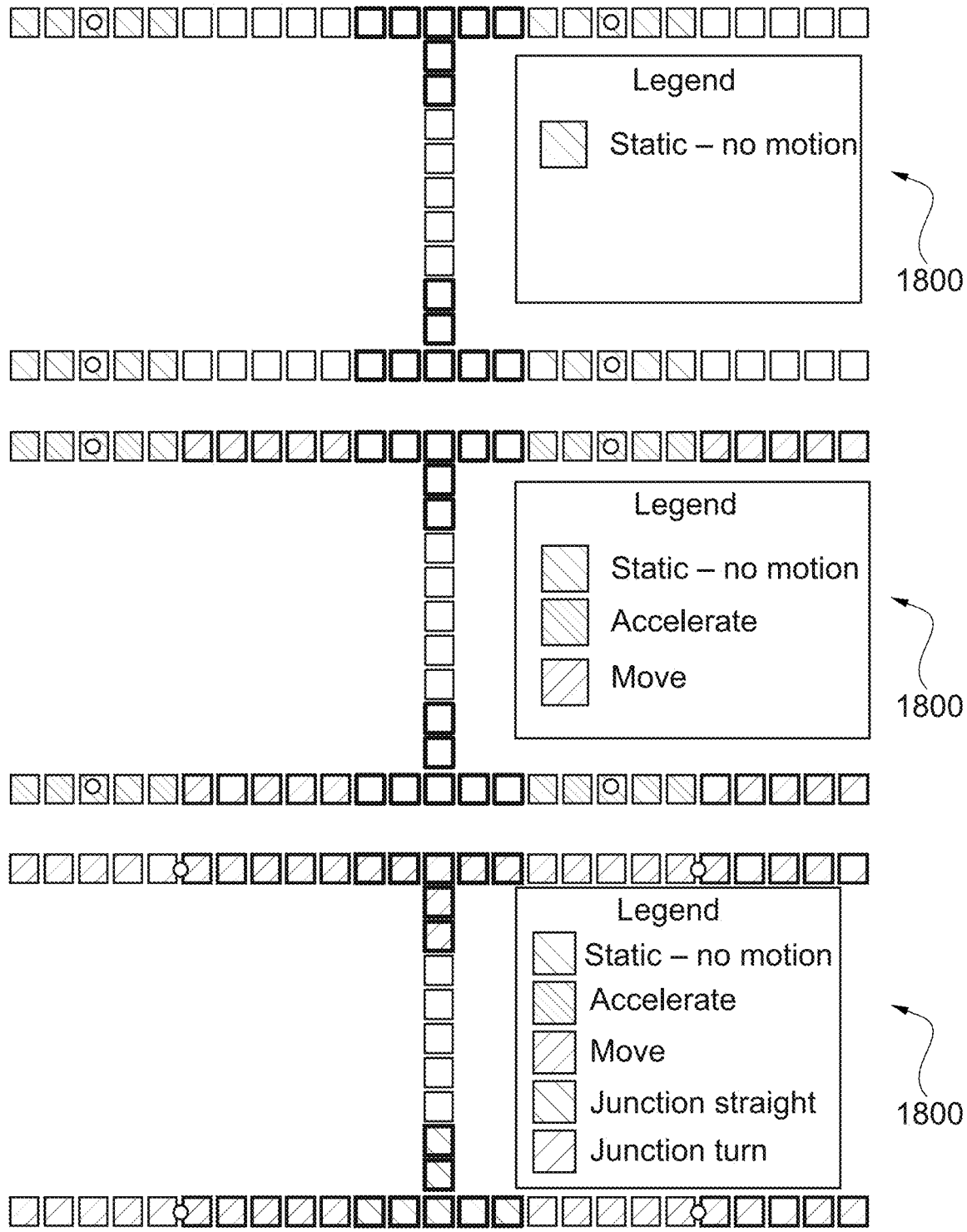
FIG. 18 is a schematic diagram of a portion of an ion trap at different times according to some embodiments.

FIG. 18 is a schematic diagram of a portion 1800 of an ion trap at different times. As illustrated, each location has a unit length which is the same size. In this embodiment, each location has a size of 5 electrodes. As illustrated, different operations are performed at each particular location at different times.

As illustrated, there are boundaries between locations and junctions, and, when moved, the ion strings move from a first location performing a first operation to a second location performing a second operation. At the boundaries between the locations, half of the segments of the first operation will influence or confine the ion string. On the other side of the ion string, the confining electrodes will be from the location of the second operation. Therefore, the waveforms of the first and second operations are designed so that moving from the first location to the second location does not cause the ion strings to be heated.

For example, in some embodiments, large scale trapped ion quantum computing may have shuttling in each same size location for a certain operation generates 1 quanta of motion or better, for example, significantly less than 1 quanta of motion. If a lot of phonons (quanta of motion) are generated, cooling of the ion strings may be used at each location.

One or more types of transitions from a first location to a second location may be accommodated.

In some embodiments, the size of the locations and junctions may be small enough or close enough that operations in adjacent locations affect the ion strings of the other location. In such embodiments, compound operations may be defined, where the waveforms used to generate a particular operation at a particular location are specialized based on operations occurring in adjacent locations and junctions. As a result, the compound operations induce analog waveforms which contribute to the performance of the operations being performed in adjacent locations. For example, the compound operations may include one or more of the following:

static—no motion and neighbors are also static static—no motion and left neighbor is braking from left to right but right neighbor is static.

static—no motion and both neighbors are accelerating away from the center static—no motion and only the right neighbors are accelerating but the left one is static static—no motion and only the right neighbors are accelerating but the left one is breaking In some embodiments, the set of compound operations includes every possible operation combined with every possible adjacent operation on each possible side of the location performing the operation.

Figure 19:
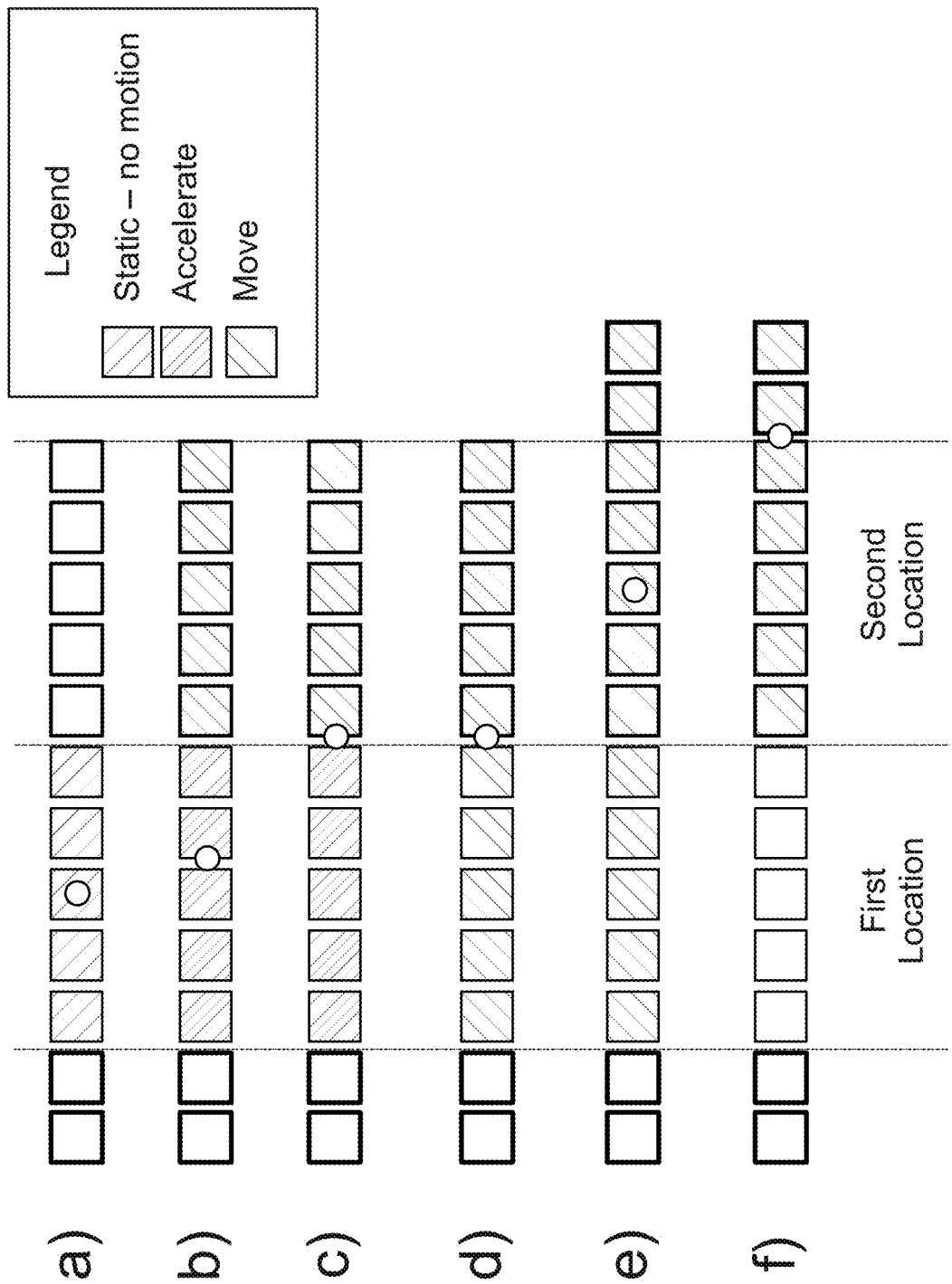
FIG. 19 illustrates operations performed on an ion string at multiple locations according to some embodiments.

FIG. 19 illustrates operations performed on an ion string at multiple locations, where the operations cause the ion string to move from a first location performing a first operation to a second location performing a second operation using a first transition strategy. As illustrated, each of the first and second locations has a unit length which has a size of 5 electrodes. In some embodiments, operation waveforms are designed so that the operation waveform changes that occur do not cause kicks or accelerations to the ion string.

At state a), the ion string is static at the first location at the beginning of a first timeslot. The operation of the electrodes outside the first location can be any operation, as the electrodes of outside the first location are too far from the ion string to affect the ion string.

At state b), the ion string is accelerated at the first location and is moved toward the second location performing a move operation. The operation of the electrodes outside the first and second locations can be any operation, as the electrodes of outside the first and second location are too far from the ion string to affect the ion string.

At state c), the ion string has been accelerated so as to move to the boundary between the first location and the second location at the end of the first timeslot. The operation of the electrodes outside the first and second locations can be any operation, as the electrodes of outside the first and second location are too far from the ion string to affect the ion string.

At state d), the operation of the first location is changed to be a move operation to match the move operation of the second location and the operation of the second location continues to be a move operation. The operation of the electrodes outside the first and second locations can be any operation, as the electrodes of outside the first and second location are too far from the ion string to affect the ion string.

At state e), the ion string has moved to the center of the second location. In addition, the operation of a next or third location is a move operation, for example, to match the move operation of the second location.

At state f), the ion string has moved to the boundary between the second location and the third location at the end of the second timeslot. In addition, the operation of the first location can be changed to any operation, as the electrodes of the first location are too far from the ion string to affect the ion string.

Because changing from one operation to the next with the voltage ramps of the shuttling waveforms changing quickly over time, digital multiplexing control may be used. In some embodiments, analog multiplexing control is used.

Figure 20:
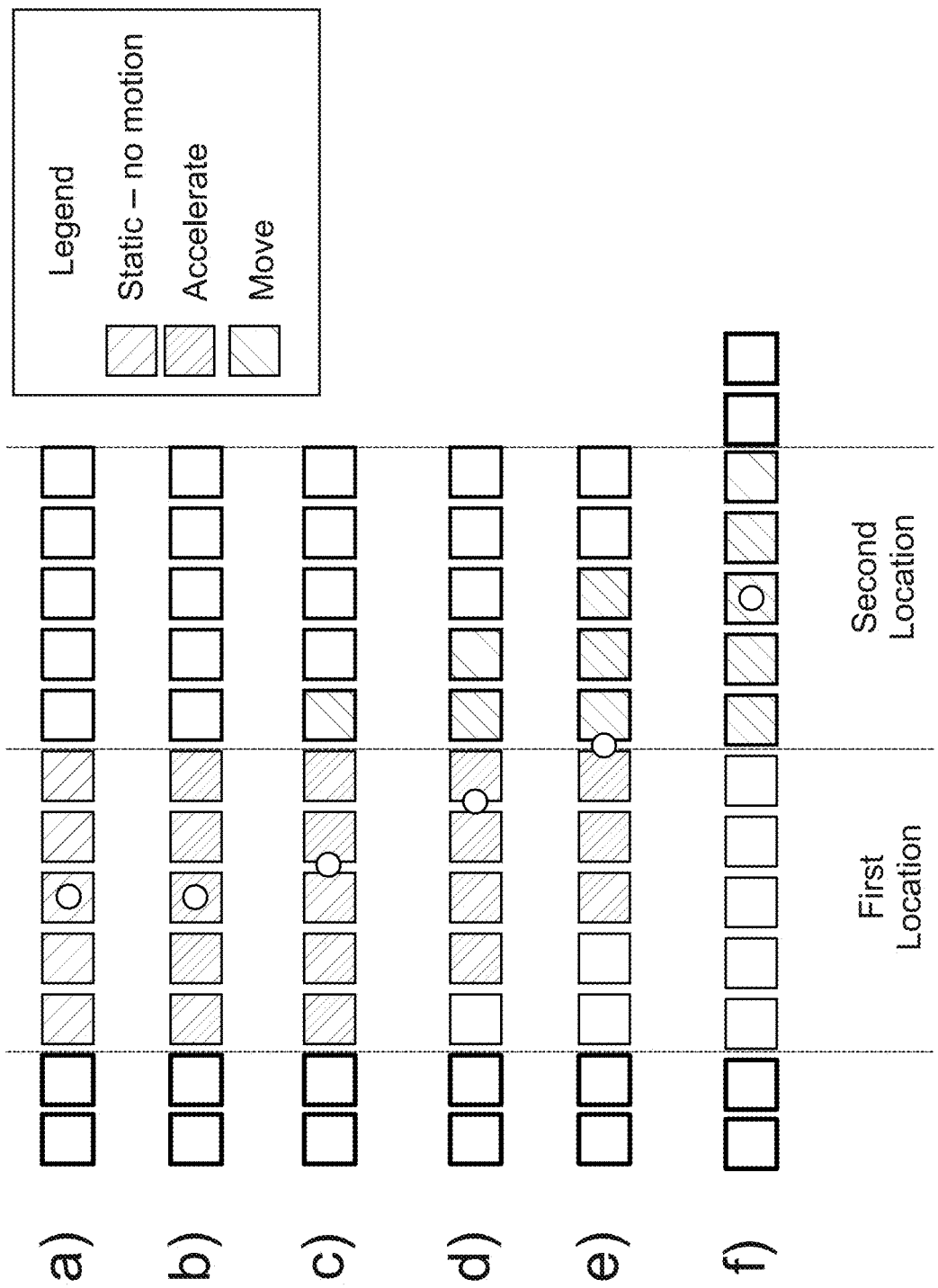
FIG. 20 illustrates operations performed on an ion string at multiple locations according to some embodiments.

FIG. 20 illustrates operations performed on an ion string at multiple locations, where the operations cause the ion string to move from a first location performing a first operation to a second location performing a second operation using a second transition strategy. As illustrated, each of the first and second locations has a unit length which has a size of 5 electrodes. In some embodiments, operation waveforms are designed so that the operation waveform changes that occur do not cause kicks or accelerations to the ion string.

At state a), the ion string is static at the first location at the beginning of a first timeslot. The operation of the electrodes outside the first location can be any operation, as the electrodes of outside the first location are too far from the ion string to affect the ion string.

At state b), the operation of the first location is changed to and accelerate operation, and the ion string is accelerated so as to move toward the second location during the first timeslot. The operation of the electrodes outside the first location can be any operation, as the electrodes of outside the first location are too far from the ion string to affect the ion string.

At state c), the ion string has been accelerated so as to move toward the second location. The operation of the second location includes a move operation waveform at the first electrode of the second location to match the move operation to be performed at the second location during the next timeslot. The operation of the electrodes farther than three electrodes from the ion string in the second location can be any operation, as those electrodes are too far from the ion string to affect the ion string.

At state d), the ion string has moved farther toward the second location. The operation of the second location includes a move operation waveform at the first and second electrodes of the second location to match the move operation to be performed at the second location during the next timeslot. The operation of the electrodes farther than three electrodes from the ion string in the first and second location can be any operation, as those electrodes are too far from the ion string to affect the ion string. For example, the operation of the first location could include an operation waveform at the first electrode of the first location to match an operation being performed at the location to the left of the first location, as shown in the figure.

At state e), the ion string has moved to the boundary between the first and second locations at the end of the first timeslot. In addition, the operation of the second location is changed to include a move operation at the first, second, and third electrodes of the second location. The operation of the electrodes farther than three electrodes from the ion string in the first and second location can be any operation, as those electrodes are too far from the ion string to affect the ion string. For example, the new operation of the second location could include an operation waveform at the fourth and fifth electrodes of the second location to match an operation being performed at the location to the right of the second location, as shown in the figure. Similarly, the new operation of the first location could include an operation waveform at the first and second electrodes of the first location to match an operation being performed at the location to the left of the first location, as shown in the figure.

At state f), the ion string has moved to the middle of the second location in the middle of the second timeslot. In addition, the operation of the second location includes a move operation waveform at all of the electrodes of the second location. Furthermore, the operation of the first location can be changed to any operation, as the electrodes of the first location are too far from the ion string to affect the ion string.

Because changing from one operation to the next with the voltage ramps of the shuttling waveforms changing quickly over time, digital multiplexing control may be used. In some embodiments, analog multiplexing control is used.

In this approach, the operation of an electrode is changed when it is not close to the ion string. This may be beneficial because if charge injection causes heating, the ion will not be close and is, thus not significantly affected. Furthermore, the voltage gradient over time of a shuttling waveform is high close to the ion string but low far away. Low gradients are helpful for zero-voltage switching during the switching from one operation to another.

In some embodiments, location and junction sizes are extended by one segment to have a "transition segment." During the shuttling time of one segment, the handover segment's voltage may be kept unchanging.

Figure 21:
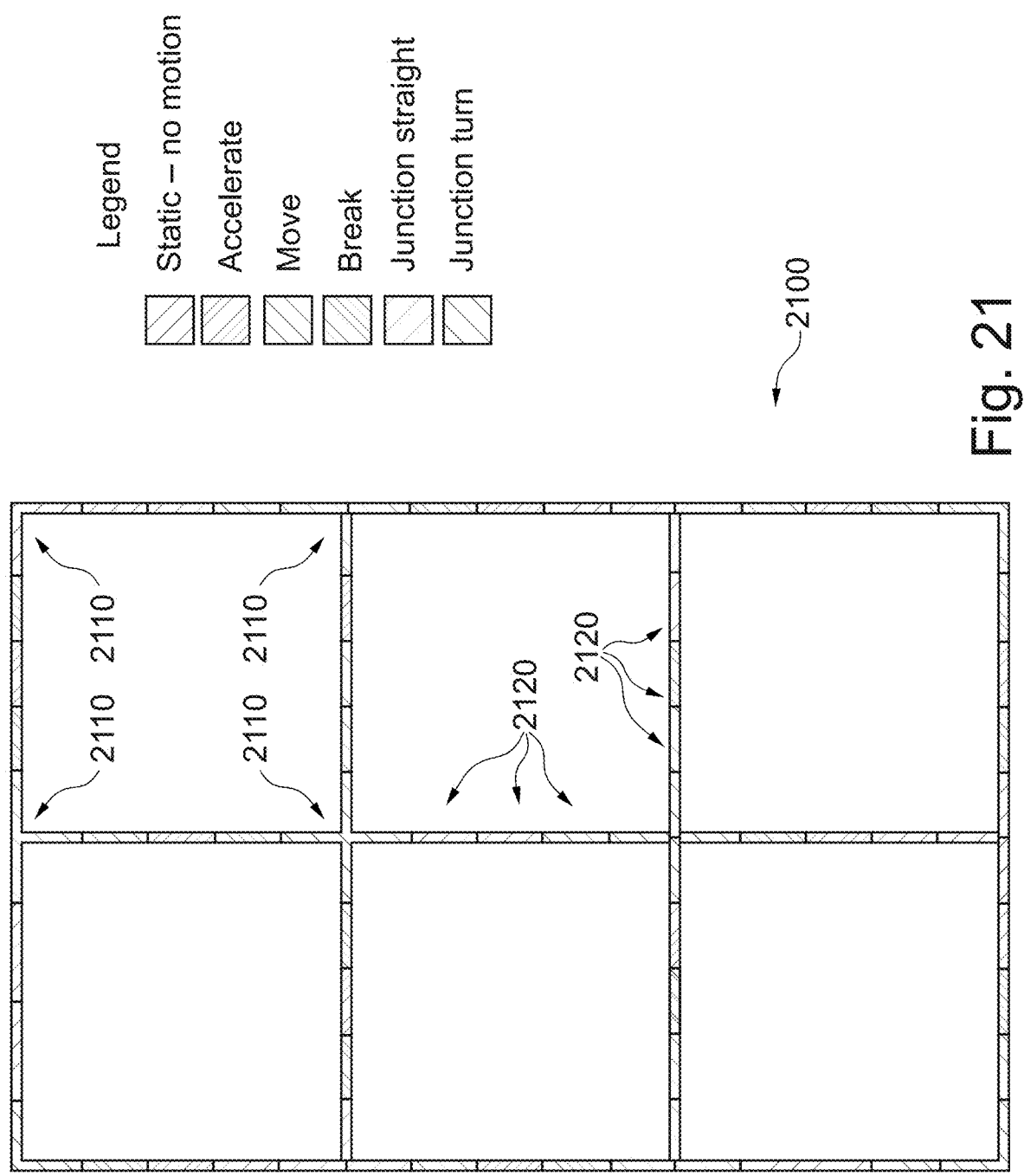
FIG. 21 is a schematic diagram of an ion trap at a particular state of ion manipulation operations according to some embodiments.

FIG. 21 is a schematic diagram of an ion trap 2100 at a particular state of ion manipulation operations according to some embodiments. Ion trap 2100 may be used, for example, for a quantum computing system. Ion trap 2100 includes junctions 2110 and locations 2120 connected between junctions.

In the illustrated embodiment, each leg of locations 2120 between the junctions 2110 includes three locations 2120. In some embodiments, different numbers of locations 2120 between the junctions 2110 may be used. For example, in some embodiments, horizontal legs between the junctions 2110 have a first number of locations, and vertical legs between the junctions 2110 have a second number of locations, wherein the first and second numbers are different.

Each junction 2110 has a first number of electrodes placed along the junction 2110, and the electrodes are connected to an ion shuttling control system having properties similar or identical to the ion shuttling control systems described herein. For example, an ion shuttling control system configured to simultaneously generate a first number of sequences of analog voltages may apply sequences of analog voltages to each of the electrodes of the junction 2110.

Each location 2120 has a second number of electrodes placed along the location 2120, and the electrodes are connected to an ion shuttling control system having properties similar or identical to the ion shuttling control systems described herein. For example, an ion shuttling control system configured to simultaneously generate a second number of sequences of analog voltages may apply sequences of analog voltages to each of the electrodes of the location 2120.

In some embodiments, more electrodes are placed along junctions 2110 than are placed along locations 2120.

As illustrated, ion trap 2100 performs ion manipulation operations at each junction 2110 and at each location 2120. In some embodiments, operations may be performed at only a portion of the ion trap at a particular time. As shown, these operations include a static operation, an accelerate operation, a move operation, a break operation, a junction straight operation, and a junction turn operation. In the illustration, which type of operation being performed at each junction 2110 and at each location 2120 are indicated.

In some embodiments, all of the locations of ion trap 2100 have the same size. Furthermore, in some embodiments, additionally or alternatively, all of the junctions of ion trap 2100 have the same size. Similarly, in some embodiments, all of the locations of ion trap 2100 have the same size, all of the junctions of ion trap 2100 have the same size, and all of the junctions have sizes corresponding with the sizes of the locations.

In some embodiments, the compiler or controller of the ion shuttling control system provides control signals which cause successive operations throughout ion trap 2100 to be synchronized in a sequence of timeslots, for example, as discussed elsewhere herein.

In some embodiments, the compiler or controller provides control signals corresponding with those discussed above with reference to any one or more of FIGS. 3, 4, 5, and 6. Accordingly, the compiler or controller may send control signals identifying operation codes identifying operations and identifying which electrodes or locations to use for implementing the operations. In response to the operation codes, a switching network establishes a logical path including a DAC from the identified electrodes to the operation registers storing data for the operation. Accordingly, when the processor computes, the compiler or controller determines and communicates operation codes instead of determining and communicating DAC codes for implementing waveforms corresponding with the operations.

Benefits of this methodology include that the compiler or controller has its computational load reduced by not calculating or determining voltage waveforms for each location or for each electrode. In some embodiments, the compiler or controller simply determines which of a relatively small number of operations is to be performed at each location and junction, for example, in each timeslot. In addition, the compiler or controller simply transmits the corresponding operation codes. In some embodiments, the operation codes may be identified with as few as two bits, three bits, four bits, five bits, or another number of bits. As a result, the compiler or controller is able to manage large numbers of operations for ion traps having large numbers of locations and junctions.

The lower levels of the architecture in the ion shuttling control system interpret the few bit operation condes, and implement the desired operations. This significantly reduces the computational load of the higher level, including the compiler or controller.

With this abstracted control system, an ion trap may be controlled, for example, with just a few bits per location and a few bits per junction for each timeslot. Without this abstraction, kilobytes of data may be necessary for each location and junction and each operation.

Furthermore, the control system limits the number of individually controlled channels that are necessary to operate the ion trap. For systems which use analog multiplexing, this is particularly advantageous. If, for example, each operation uses 10 DACs, only 60 DACs would be used for 6 operations to operate a trap that may, for example, have 3200 segments.

Embodiments of the present invention are summarized here. Other embodiments can also be understood from the entirety of the specification and the claims filed herein.

One embodiment is an ion shuttling control system, including a controller configured to generate a first operation code, the first operation code indicating a first ion manipulation operation of a plurality of ion manipulation operations and a first set of electrodes of a plurality of sets of electrodes of an ion trap; a plurality of digital-to-analog converters (DACs) configured to generate a first set of analog waveforms, the first set of analog waveforms being selected based on the first operation code; and a switching network configured to provide the first set of analog waveforms to the first set of electrodes, the first set of electrodes being selected based on the first operation code. In some embodiments, the first set of analog waveforms includes a respective analog waveform for each electrode of the first set of electrodes, and each respective analog waveform of the first set of analog waveforms has a same first time duration. In some embodiments, the controller is further configured to generate a second operation code, the second operation code indicating a second ion manipulation operation of the plurality of ion manipulation operations and a second set of electrodes of the plurality of sets of electrodes, where the plurality of DACs is further configured to generate a second set of analog waveforms, the second set of analog waveforms being selected based on the second operation code, and where the switching network is further configured to provide the second set of analog waveforms to the second set of electrodes, the second set of electrodes being selected based on the second operation code, where the first set of electrodes and the second set of electrodes have a same number of electrodes, where the second set of analog waveforms includes a respective analog waveform for each electrode of the second set of electrodes. In some embodiments, each respective analog waveform of the first set of analog waveforms and each respective analog waveform for each electrode of the second set of analog waveforms has the same first time duration. In some embodiments, each respective analog waveform for each electrode of the second set of analog waveforms has a same second time duration, where the second time duration is a multiple integer number of the same first time duration. In some embodiments, the first set of analog waveforms is provided to the first set of electrodes simultaneously to when the second set of analog waveforms is provided to the second set of electrodes. In some embodiments, the system further includes a plurality of operation registers coupled to the plurality of DACs and configured to store data corresponding with the plurality of ion manipulation operations, where the switching network is configured to provide the first set of analog waveforms to the first set of electrodes by forming a signal path from a first operation register of the plurality of operation registers through a first set of multiplexors and through a first set of DACs to the first set of electrodes. In some embodiments, outputs of the first set of DACs are respectively coupled to inputs of the first set of multiplexors, and where outputs of the first set of multiplexors are respectively coupled to the first set of electrodes. In some embodiments, inputs of the first set of multiplexors are respectively coupled to outputs of the first operation register, where outputs of the first set of multiplexors are respectively coupled to the first set of DACs, and where outputs of the first set of DACs are respectively coupled to the first set of electrodes. In some embodiments, the first set of analog waveforms when applied to the first set of electrodes causes a first electric field being generated that includes a minimum value at a first position. In some embodiments, the first position changes over the first time duration from a first electrode of the first set of electrodes to a second electrode of the first set of electrodes. In some embodiments, the controller is further configured to generate a third operation code and a fourth operation code, the third operation code indicating a third ion manipulation operation of the plurality of ion manipulation operations and the first set of electrodes of the plurality of sets of electrodes, the fourth operation code indicating a fourth ion manipulation operation of the plurality of ion manipulation operations and the second set of electrodes of the plurality of sets of electrodes, where the plurality of DACs is further configured to generate a third set of analog waveforms and a fourth set of analog waveforms, the third set of analog waveforms being selected based on the third operation code, the fourth set of analog waveforms being selected based on the fourth operation code, and where the switching network is further configured to provide the third set of analog waveforms to the first set of electrodes and to provide the fourth set of analog waveforms to the second set of electrodes, the first set of electrodes being selected based on the third operation code, the second set of electrodes being selected based on the fourth operation code. In some embodiments, the first ion manipulation operation and the second ion manipulation operation corresponds to at least one of a no motion operation, an accelerate operation, a move operation, a junction straight operation, a junction turn operation, split operation, merge operation and rotation operation. In some embodiments, each set of electrodes of the plurality of sets of electrodes has a same number of electrodes greater than or equal to four. In some embodiments, the first set of electrodes and the second set of electrodes are adjacent to one another, and where an electrode of the first set of electrodes is adjacent to an electrode of the second set of electrodes; where a first analog waveform of the first set of analog waveforms is provided to the electrode of the first set of electrodes, and where a second analog waveform of the second set of analog waveforms is provided to the electrode of the second set of electrodes; where a time duration of the first analog waveform and the second analog waveform is the same; and where a value of the first analog waveform and a value of the second analog waveform are the same at an end of the time duration.

Another embodiment is another embodiment is an ion shuttling control system, including a plurality of digital-to-analog converters (DACs) configured to be coupled to a plurality of sets of electrodes of an ion trap, each set of electrodes having a same number of electrodes; a controller configured to generate first and second operation codes, the first operation code indicating data for first ion manipulation operations and a first set of electrodes of the plurality of sets of electrodes, and the second operation code indicating data for second ion manipulation operations and a second set of electrodes of the plurality of sets of electrodes; and a switching network configured to in response to the first operation code provide a first set of analog waveforms generated by the plurality of DACs based on the data for the first ion manipulation operations to the first set of electrodes; and in response to the second operation code provide a second set of analog waveforms generated by the plurality of DACs based on the data for the second ion manipulation operations to the second set of electrodes. In some embodiments, the data for the first ion manipulation operations and the data for the second ion manipulation operations correspond to different ion manipulation operations. In some embodiments, each analog waveform of the first set of analog waveforms has a same first time duration. In some embodiments, the controller is configured to, after generating the first and the second operation codes, generate third and fourth operation codes, the third operation code indicating data for third ion manipulation operations and the first set of electrodes of the plurality of sets of electrodes, and the fourth operation code indicating data for fourth ion manipulation operations and the second set of electrodes of the plurality of sets of electrodes; the switching network is configured to in response to the first operation code, provide the first set of analog waveforms to the first set of electrode outputs for the first time duration; and in response to the third operation code provide, for the first time duration, a third set of analog waveforms generated by the DACs based on the data for the third manipulation operations to the first set of electrode outputs; and in response to the second operation code, provide the second set of analog waveforms to the second set of electrodes for the first time duration; and in response to the fourth operation code provide, for the first time duration a fourth set of analog waveforms generated by the DACs based on the data for the fourth manipulation operations to the second set of electrodes. In some embodiments, the second set of electrodes are adjacent to the first set of electrodes; the first, second, third and fourth ion manipulation operations cause an ion to move from a location corresponding with the first set of electrodes to a location corresponding with the second set of electrodes; and the controller is configured to select the third ion manipulation operation based on the second ion manipulation operation such that the third ion manipulation operation and the second ion manipulation operation are the same. In some embodiments, the second set of electrodes are adjacent to the first set of electrodes; the first, second, third and fourth operations cause an ion to move from a location corresponding with the first set of electrodes to a location corresponding with the second set of electrodes; and the controller is configured to select the second ion manipulation operation based on the fourth ion manipulation operation such that the second set of analog waveforms correspond with the fourth ion manipulation operation.

Another embodiment is an ion shuttling control system, including a plurality of digital-to-analog converters (DACs) configured to be coupled to a plurality of sets of electrode outputs configured to be connected to a plurality of sets of electrodes of an ion trap, each set of electrode outputs having a same number of electrode outputs; a plurality of operation registers coupled to the DACs and configured to store data corresponding with a plurality of ion manipulation operations; a controller configured to generate first and second operation codes, the first and second operation codes respectively identifying first and second operation registers respectively storing data for first and second ion manipulation operations, the first and second operation codes respectively identifying first and second sets of electrode outputs; and a switching network configured to in response to the first operation code select a first operation register based on the first operation code, and provide a first set of analog waveforms generated by the DACs based on the data stored in the first operation register to a first set of electrode outputs, the first set of electrode outputs being identified by the first operation code; and in response to the second operation code select a second operation register based on the second operation code, and provide a second set of analog waveforms generated by the DACs based on the data stored in the second operation register to a second set of electrode outputs, the second set of electrode outputs being identified by the second operation code. In some embodiments, the data stored in the first and the second operation registers respectively correspond with first and second different ion manipulation operations. In some embodiments, the switching network is configured to provide the first set of analog waveforms to the first set of electrode outputs by forming a signal path from the first operation register through a first set of multiplexors and through a first set of DACs to the first set of electrode outputs. In some embodiments, outputs of the first set of DACs are respectively coupled to inputs of the first set of multiplexors, and where outputs of the first set of multiplexors are respectively coupled to the first set of electrode outputs. In some embodiments, inputs of the first set of multiplexors are respectively coupled to outputs of the first operation register, where outputs of the first set of multiplexors are respectively coupled to the first set of DACs, and where outputs of the first set of DACs are respectively coupled to the first set of electrode outputs. In some embodiments, the controller is configured to generate third and fourth operation codes, the third and fourth operation codes respectively identifying third and fourth operation registers respectively storing data for third and fourth ion manipulation operations, the third and fourth operation codes respectively identifying the first and second sets of electrode outputs; the switching network is configured to in response to the first operation code, provide the first set of analog waveforms to the first set of electrode outputs for a first predetermined time duration; and in response to the third operation code select a third operation register based on the third operation code, and provide, for the first predetermined time duration, a third set of analog waveforms generated by the DACs based on the data stored in the third operation register to the first set of electrode outputs, the first set of electrodes being identified by the third operation code; and in response to the second operation code, provide the second set of analog waveforms to the second set of electrode outputs for the predetermined time duration; and in response to the fourth operation code select a fourth operation register based on the fourth operation code, and provide, for the predetermined time duration a fourth set of analog waveforms generated by the DACs based on the data stored in the fourth operation register to the second set of electrode outputs, the second set of electrode outputs being identified by the fourth operation code. In some embodiments, the first set of electrode outputs correspond with a first set of electrodes of the ion trap; the second set of electrode outputs correspond with a second set of electrodes of the ion trap, where the second set of electrodes are adjacent to the first set of electrodes; the first, second, third and fourth ion manipulation operations cause an ion to move from a location corresponding with the first set of electrodes to a location corresponding with the second set of electrodes; and the controller is configured to select the third ion manipulation operation based on the second ion manipulation operation such that the third ion manipulation operation and the second ion manipulation operation are the same. In some embodiments, the first set of electrode outputs correspond with a first set of electrodes of the ion trap; the second set of electrode outputs correspond with a second set of electrodes of the ion trap, where the second set of electrodes are adjacent to the first set of electrodes; the first, second, third and fourth operations cause an ion to move from a location corresponding with the first set of electrodes to a location corresponding with the second set of electrodes; and the controller is configured to select the second ion manipulation operation based on the fourth ion manipulation operation such that the second set of analog waveforms correspond with the fourth ion manipulation operation. In some embodiments, the second set of analog waveforms contribute to a performance of the first ion manipulation operation. In some embodiments, the first set of analog waveforms are configured to induce electric fields which cause an ion to move away from a first ion-trap location toward a second ion-trap location.

Another embodiment is an ion shuttling control system, including a plurality of digital-to-analog converters (DACs) configured to be coupled to a plurality of sets of electrode outputs configured to be connected to a plurality of sets of electrodes of an ion trap, each set of electrode outputs having a same number of electrode outputs; a plurality of operation registers coupled to the plurality of DACs and configured to store data corresponding with a plurality of ion manipulation operations; a controller configured to generate first and second series of operation codes, the first and second series of operation codes including operation codes each identifying one of a plurality of operation registers and respectively identifying first and second sets of electrode outputs; and a switching network configured to during each particular timeslot of a series of consecutive timeslots in response to a next operation code of the first series of operation codes select a next operation register based on the next operation code of the first series of operation codes, and provide a next set of analog waveforms generated by the DACs based on the data of the next operation register to a first set of electrode outputs, the first set of electrode outputs being identified by the next operation code of the first series of operation codes; and in response to a next operation code of the second series of operation codes select another operation register based on the next operation code of the second series of operation codes, and provide a next set of analog waveforms generated by the DACs based on the data stored in the other operation register to a second set of electrode outputs, the second set of electrode outputs being identified by the next operation code of the second series of operation codes. In some embodiments, the switching network is configured to provide the next set of analog waveforms to the first set of electrode outputs by forming a signal path from the next operation register through a first set of multiplexors and through a first set of DACs to the first set of electrode outputs. In some embodiments, outputs of the first set of DACs are respectively coupled to inputs of the first set of multiplexors, and where outputs of the first set of multiplexors are respectively coupled to the first set of electrode outputs. In some embodiments, inputs of the first set of multiplexors are respectively coupled to outputs of the first operation register, where outputs of the first set of multiplexors are respectively coupled to the first set of DACs, and where outputs of the first set of DACs are respectively coupled to the first set of electrode outputs. In some embodiments, the first set of electrode outputs correspond with a first set of electrodes of the ion trap; the second set of electrode outputs correspond with a second set of electrodes of the ion trap, where the second set of electrodes are adjacent to the first set of electrodes; a first operation code of the first series of operation codes and a first operation code of the second series of operation codes are generated during a first timeslot; a second operation code of the first series of operation codes and a second operation code of the second series of operation codes are generated during a second timeslot, the first and second timeslots being consecutive; the first operation code of the first series of operation codes, the first operation code of the second series of operation codes, the second operation code of the first series of operation codes, and the second operation code of the second series of operation codes cause an ion to move from a first location corresponding with the first set of electrodes to a second location corresponding with the second set of electrodes; and the controller is configured to select the second operation code of the first series of operation codes based on the first operation code of the first series of operation codes such that the second operation code of the first series of operation codes and the first operation code of the first series of operation codes are the same. In some embodiments, the first set of electrode outputs correspond with a first set of electrodes of the ion trap; the second set of electrode outputs correspond with a second set of electrodes of the ion trap, where the second set of electrodes are adjacent to the first set of electrodes; a first operation code of the first series of operation codes and a first operation code of the second series of operation codes are generated during a first timeslot; a second operation code of the first series of operation codes and a second operation code of the second series of operation codes are generated during a second timeslot, the first and second timeslots being consecutive; the first operation code of the first series of operation codes, the first operation code of the second series of operation codes, the second operation code of the first series of operation codes, and the second operation code of the second series of operation codes cause an ion to move from a first location corresponding with the first set of electrodes to a second location corresponding with the second set of electrodes; and the controller is configured to select the first operation code of the second series of operation codes based on the second operation code of the second series of operation codes such that the analog waveforms of the first operation code of the second series of operation codes correspond with the operation of the second operation code of the second series of operation codes.

Another embodiment is an ion trap system, including an ion trap; and an ion shuttling control system, including a plurality of digital-to-analog converters (DACs) configured to be coupled to a plurality of sets of electrodes of the ion trap, each set of electrodes having a same number of electrodes; a plurality of operation registers coupled to the plurality of DACs and configured to store data corresponding with a plurality of ion manipulation operations; a controller configured to generate first and second operation codes, the first and second operation codes respectively identifying first and second operation registers and respectively identifying first and second sets of electrodes; and a switching network configured to in response to the first operation code select a first operation register based on the first operation code, and provide a first set of analog waveforms generated by the DACs based on the data stored in the first operation register to a first set of electrodes, the first set of electrodes being identified by the first operation code; and in response to the second operation code select a second operation register based on the second operation code, and provide a second set of analog waveforms generated by the DACs based on the data stored in the second operation register to a second set of electrodes, the second set of electrodes being identified by the second operation code. In some embodiments, the switching network is configured to provide the first set of analog waveforms to the first set of electrodes by forming a signal path from the first operation register through a first set of multiplexors and through a first set of DACs to the first set of electrodes, where outputs of the first set of DACs are respectively coupled to inputs of the first set of multiplexors, and where outputs of the first set of multiplexors are respectively coupled to the first set of electrodes. In some embodiments, the switching network is configured to provide the first set of analog waveforms to the first set of electrodes by forming a signal path from the first operation register through a first set of multiplexors and through a first set of DACs to the first set of electrodes, where inputs of the first set of multiplexors are respectively coupled to outputs of the first operation register, where outputs of the first set of multiplexors are respectively coupled to the first set of DACs, and where outputs of the first set of DACs are respectively coupled to the first set of electrodes. In some embodiments, the controller is configured to generate third and fourth operation codes, the third and fourth operation codes respectively identifying third and fourth operation registers and respectively identifying the first and second sets of electrodes; the switching network is configured to in response to the first operation code, provide the first set of analog waveforms to the first set of electrodes for a first predetermined time duration; and in response to the third operation code select a third operation register based on the third operation code, and provide, for the first predetermined time duration, a third set of analog waveforms generated by the DACs based on the data stored in the third operation register to the first set of electrodes, the first set of electrodes being identified by the third operation code; and in response to the second operation code, provide the second set of analog waveforms to the second set of electrodes for the predetermined time duration; and in response to the fourth operation code select a fourth operation register based on the fourth operation code, and provide, for the predetermined time duration a fourth set of analog waveforms generated by the DACs based on the data stored in the fourth operation register to the second set of electrodes, the second set of electrodes being identified by the fourth operation code.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An ion shuttling control system, comprising:
   a controller configured to generate a first operation code, the first operation code indicating a first ion manipulation operation of a plurality of ion manipulation operations and a first set of electrodes of a plurality of sets of electrodes of an ion trap;
   a plurality of digital-to-analog converters (DACs) configured to generate a first set of analog waveforms, the first set of analog waveforms being selected based on the first operation code; and
   a switching network configured to provide the first set of analog waveforms to the first set of electrodes, the first set of electrodes being selected based on the first operation code, wherein the first set of analog waveforms comprises a respective analog waveform for each electrode of the first set of electrodes, and wherein each respective analog waveform of the first set of analog waveforms has a same first time duration.

2. The ion shuttling control system of claim 1, wherein the controller is further configured to generate a second operation code, the second operation code indicating a second ion manipulation operation of the plurality of ion manipulation operations and a second set of electrodes of the plurality of sets of electrodes,
   wherein the plurality of DACs is further configured to generate a second set of analog waveforms, the second set of analog waveforms being selected based on the second operation code, and
   wherein the switching network is further configured to provide the second set of analog waveforms to the second set of electrodes, the second set of electrodes being selected based on the second operation code,
   wherein the first set of electrodes and the second set of electrodes have a same number of electrodes,
   wherein the second set of analog waveforms comprises a respective analog waveform for each electrode of the second set of electrodes.

3. The ion shuttling control system of claim 2, wherein each respective analog waveform of the first set of analog waveforms and each respective analog waveform for each electrode of the second set of analog waveforms has the same first time duration.

4. The ion shuttling control system of claim 2, wherein each respective analog waveform for each electrode of the second set of analog waveforms has a same second time duration, wherein the second time duration is a multiple integer number of the same first time duration.

5. The ion shuttling control system of claim 2, wherein the first set of analog waveforms is provided to the first set of electrodes simultaneously to when the second set of analog waveforms is provided to the second set of electrodes.

6. The ion shuttling control system of claim 1, further comprising:
   a plurality of operation registers coupled to the plurality of DACs and configured to store data corresponding with the plurality of ion manipulation operations,
   wherein the switching network is configured to provide the first set of analog waveforms to the first set of electrodes by forming a signal path from a first operation register of the plurality of operation registers through a first set of multiplexors and through a first set of DACs to the first set of electrodes.

7. The ion shuttling control system of claim 6, wherein outputs of the first set of DACs are respectively coupled to inputs of the first set of multiplexors, and wherein outputs of the first set of multiplexors are respectively coupled to the first set of electrodes.

8. The ion shuttling control system of claim 6, wherein inputs of the first set of multiplexors are respectively coupled to outputs of the first operation register, wherein outputs of the first set of multiplexors are respectively coupled to the first set of DACs, and wherein outputs of the first set of DACs are respectively coupled to the first set of electrodes.

9. The ion shuttling control system of claim 1, wherein the first set of analog waveforms when applied to the first set of electrodes is configured to cause a first electric field to be generated that comprises a minimum value at a first position.

10. The ion shuttling control system of claim 9, wherein the first position changes over the first time duration from a first electrode of the first set of electrodes to a second electrode of the first set of electrodes.

11. The ion shuttling control system of claim 5,
    wherein the controller is further configured to generate a third operation code and a fourth operation code, the third operation code indicating a third ion manipulation operation of the plurality of ion manipulation operations and the first set of electrodes of the plurality of sets of electrodes, the fourth operation code indicating a fourth ion manipulation operation of the plurality of ion manipulation operations and the second set of electrodes of the plurality of sets of electrodes,
    wherein the plurality of DACs is further configured to generate a third set of analog waveforms and a fourth set of analog waveforms, the third set of analog waveforms being selected based on the third operation code, the fourth set of analog waveforms being selected based on the fourth operation code, and
    wherein the switching network is further configured to provide the third set of analog waveforms to the first set of electrodes and to provide the fourth set of analog waveforms to the second set of electrodes, the first set of electrodes being selected based on the third operation code, the second set of electrodes being selected based on the fourth operation code.

12. The ion shuttling control system of claim 2, wherein the first ion manipulation operation and the second ion manipulation operation correspond to at least one of: a no motion operation, an accelerate operation, a move operation, a junction straight operation, a junction turn operation, a split operation, a merge operation or a rotation operation.

13. The ion shuttling control system of claim 2, wherein each set of electrodes of the plurality of sets of electrodes has a same number of electrodes greater than or equal to four.

14. The ion shuttling control system of claim 2,
wherein the first set of electrodes and the second set of electrodes are adjacent to one another, and wherein an electrode of the first set of electrodes is adjacent to an electrode of the second set of electrodes;
wherein a first analog waveform of the first set of analog waveforms is provided to the electrode of the first set of electrodes, and wherein a second analog waveform of the second set of analog waveforms is provided to the electrode of the second set of electrodes;
wherein a time duration of the first analog waveform and the second analog waveform is the same; and
wherein a value of the first analog waveform and a value of the second analog waveform are the same at an end of the time duration.

15. An ion shuttling control system, comprising:
a plurality of digital-to-analog converters (DACs) configured to be coupled to a plurality of sets of electrodes of an ion trap, each set of electrodes having a same number of electrodes;
a controller configured to generate first and second operation codes, the first operation code indicating data for first ion manipulation operations and a first set of electrodes of the plurality of sets of electrodes, and the second operation code indicating data for second ion manipulation operations and a second set of electrodes of the plurality of sets of electrodes; and
a switching network configured to:
in response to the first operation code:
provide a first set of analog waveforms generated by the plurality of DACs based on the data for the first ion manipulation operations to the first set of electrodes, wherein each analog waveform of the first set of analog waveforms has a same first time duration; and
in response to the second operation code:
provide a second set of analog waveforms generated by the plurality of DACs based on the data for the second ion manipulation operations to the second set of electrodes.

16. The ion shuttling control system of claim 15, wherein the data for the first ion manipulation operations and the data for the second ion manipulation operations correspond to different ion manipulation operations.

17. The ion shuttling control system of claim 15, wherein:
the controller is configured to, after generating the first and the second operation codes, generate third and fourth operation codes, the third operation code indicating data for third ion manipulation operations and the first set of electrodes of the plurality of sets of electrodes, and the fourth operation code indicating data for fourth ion manipulation operations and the second set of electrodes of the plurality of sets of electrodes;
the switching network is configured to:
in response to the first operation code, provide the first set of analog waveforms to the first set of electrodes for the first time duration; and
in response to the third operation code:
provide, for the first time duration, a third set of analog waveforms generated by the DACs based on the data for the third ion manipulation operations to the first set of electrodes; and
in response to the second operation code, provide the second set of analog waveforms to the second set of electrodes for the first time duration; and
in response to the fourth operation code:
provide, for the first time duration, a fourth set of analog waveforms generated by the DACs based on the data for the fourth ion manipulation operations to the second set of electrodes.

18. The ion shuttling control system of claim 17, wherein:
the second set of electrodes are adjacent to the first set of electrodes;
the first, second, third and fourth ion manipulation operations are configured to cause an ion to move from a location corresponding with the first set of electrodes to a location corresponding with the second set of electrodes; and
the controller is configured to select the third ion manipulation operation based on the second ion manipulation operation such that the third ion manipulation operation and the second ion manipulation operation are the same.

19. The ion shuttling control system of claim 17, wherein:
the second set of electrodes are adjacent to the first set of electrodes;
the first, second, third and fourth ion manipulation operations are configured to cause an ion to move from a location corresponding with the first set of electrodes to a location corresponding with the second set of electrodes; and
the controller is configured to select the second ion manipulation operation based on the fourth ion manipulation operation such that the second set of analog waveforms correspond with the fourth ion manipulation operation.

20. A method, comprising:
generating, by a controller, first and second operation codes, the first operation code indicating data for first ion manipulation operations and a first set of electrodes of a plurality of sets of electrodes of an ion trap, and the second operation code indicating data for second ion manipulation operations and a second set of electrodes of the plurality of sets of electrodes, each set of electrodes having a same number of electrodes;
in response to the first operation code:
providing, by a switching network, a first set of analog waveforms generated by a plurality of digital-to-analog converters (DACs) based on the data for the first ion manipulation operations to the first set of electrodes, wherein each analog waveform of the first set of analog waveforms has a same first time duration; and
in response to the second operation code:
providing, by the switching network, a second set of analog waveforms generated by the plurality of DACs based on the data for the second ion manipulation operations to the second set of electrodes.

21. The method of claim 20, wherein the data for the first ion manipulation operations and the data for the second ion manipulation operations correspond to different ion manipulation operations.

* * * * *